(12) United States Patent
Ishigaki et al.

(10) Patent No.: US 9,269,006 B2
(45) Date of Patent: Feb. 23, 2016

(54) IMAGING APPARATUS, VEHICLE SYSTEM, AND IMAGE-PROCESSING METHOD FOR IMAGE MAGNIFICATION AND EXPANSION

(71) Applicants: Tomoko Ishigaki, Kanagawa (JP); Hiroyoshi Sekiguchi, Kanagawa (JP)

(72) Inventors: Tomoko Ishigaki, Kanagawa (JP); Hiroyoshi Sekiguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 500 days.

(21) Appl. No.: 13/743,500

(22) Filed: Jan. 17, 2013

(65) Prior Publication Data
US 2013/0188051 A1     Jul. 25, 2013

(30) Foreign Application Priority Data

Jan. 19, 2012 (JP) ................................. 2012-008934
Oct. 26, 2012 (JP) ................................. 2012-236921

(51) Int. Cl.
*H04N 7/18*  (2006.01)
*G06K 9/00*  (2006.01)
(Continued)

(52) U.S. Cl.
CPC ........ *G06K 9/00791* (2013.01); *G06K 9/00798* (2013.01); *G06K 9/00825* (2013.01); *G06K 9/209* (2013.01); *G06K 9/2018* (2013.01); *G06T 5/009* (2013.01); *G06T 5/40* (2013.01);
(Continued)

(58) Field of Classification Search
CPC .......... G06K 9/00791; G06K 9/00825; G06K 9/2018; G06K 9/209; G06K 9/00798; G06T 2007/10004; G06T 2007/30256; G06T 5/40; G06T 5/009

USPC ............ 359/676; 348/345, 240.99, 335, 342, 348/360, 148, 117, 118, 229.1; 340/435–437; 701/28, 36, 301
See application file for complete search history.

(56) References Cited

U.S. PATENT DOCUMENTS

| 6,864,916 B1 | 3/2005 | Nayar et al. |
| 2002/0012064 A1* | 1/2002 | Yamaguchi ................... 348/362 |

(Continued)

FOREIGN PATENT DOCUMENTS

| JP | 10-332576 | 12/1998 |
| JP | 11-175702 | 7/1999 |

(Continued)

OTHER PUBLICATIONS

Pratt, W.K., "10. Image Enhancement," Digital Image Processing, pp. 263-285, 1991.

(Continued)

*Primary Examiner* — Victor Kostak
(74) *Attorney, Agent, or Firm* — Harness, Dickey & Pierce, P.L.C.

(57) ABSTRACT

A dynamic expansion operation of an index value image is performed by specifying an index value range before correction (Gmin to Gmax) for one index value image, calculating magnification K for which to be expanded to an ideal index value range (0 to 1023), and correcting an index value before correction G by the magnification K. An effective magnification Kthre to expand a maximum effective index value range (215 to 747) that can be taken by the index value before correction G calculated from transmittance of a filter to the ideal index value range (0 to 1023) is stored, and in a case where the calculated magnification K is smaller than the effective magnification Kthre, the expansion operation is performed by use of the effective magnification Kthre.

16 Claims, 22 Drawing Sheets

(51) Int. Cl.
  *G06T 5/00*  (2006.01)
  *G06T 5/40*  (2006.01)
  *G06K 9/20*  (2006.01)

(52) U.S. Cl.
  CPC ............... *G06T2207/10004* (2013.01); *G06T 2207/30256* (2013.01)

(56) References Cited

U.S. PATENT DOCUMENTS

| | | | |
|---|---|---|---|
| 2005/0041113 A1* | 2/2005 | Nayar et al. | 348/219.1 |
| 2005/0134440 A1* | 6/2005 | Breed | 340/435 |
| 2006/0178830 A1* | 8/2006 | Sherony | 701/301 |
| 2007/0206111 A1* | 9/2007 | Iwane | 348/342 |
| 2009/0203513 A1* | 8/2009 | Hashimoto | 501/65 |
| 2010/0001071 A1* | 1/2010 | Ohara et al. | 235/454 |
| 2010/0013965 A1 | 1/2010 | Pugh, Jr. et al. | |
| 2010/0165476 A1* | 7/2010 | Eguchi | 359/680 |
| 2011/0169943 A1 | 7/2011 | Bachmann, II et al. | |
| 2012/0105843 A1* | 5/2012 | Hirai et al. | 356/305 |
| 2012/0242835 A1 | 9/2012 | Li et al. | |
| 2013/0135516 A1* | 5/2013 | Kitajima | 348/345 |

FOREIGN PATENT DOCUMENTS

| | | |
|---|---|---|
| JP | 2004-279279 | 10/2004 |
| JP | 2011-150687 | 8/2011 |
| JP | 2011-150689 | 8/2011 |
| WO | WO 2012/002552 | 1/2012 |

OTHER PUBLICATIONS

European Search Report dated Apr. 15, 2013.

* cited by examiner

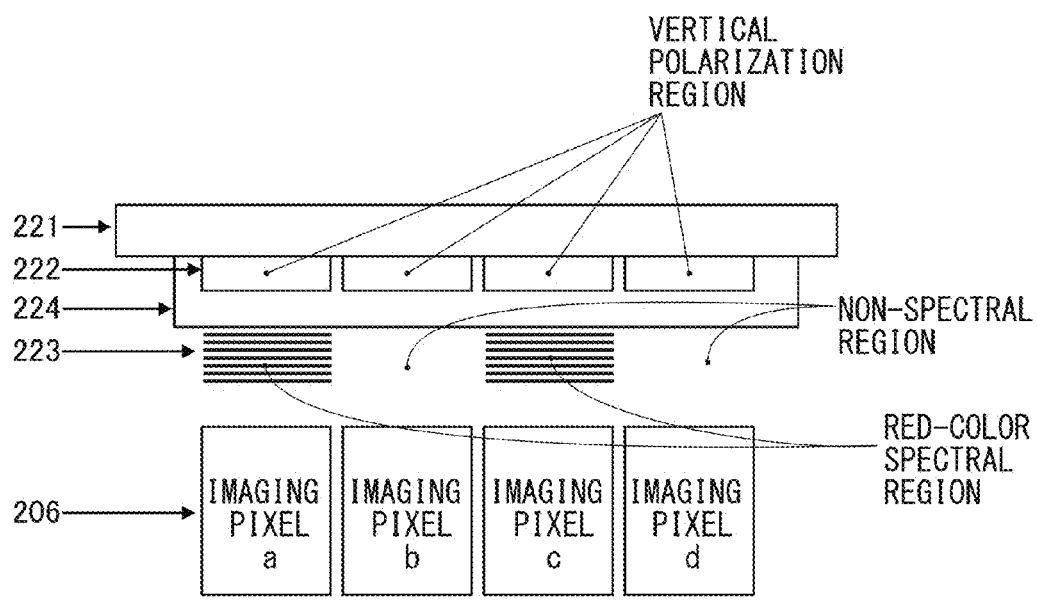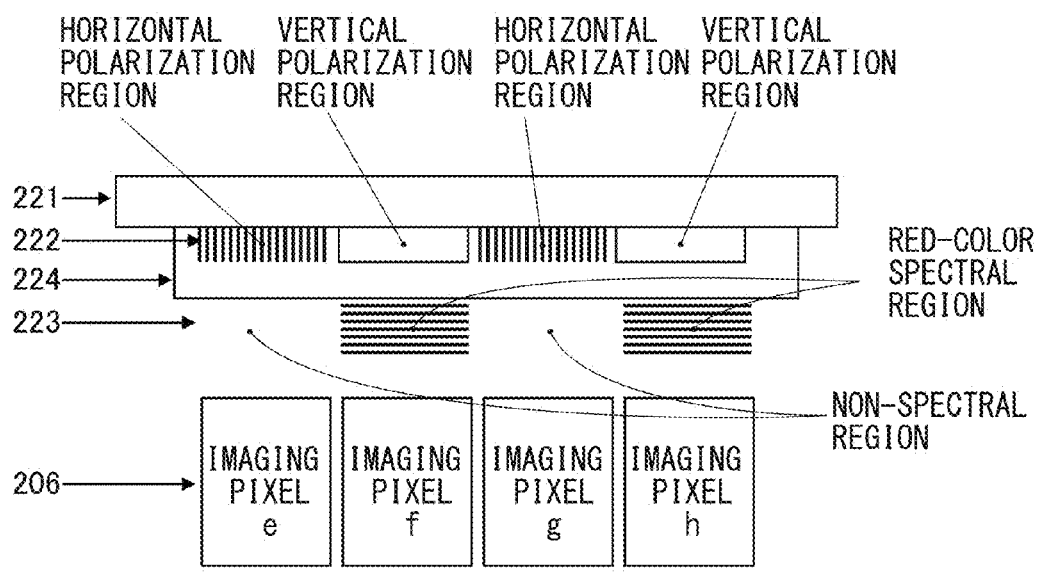

FIG.27A
BEFORE OPERATION
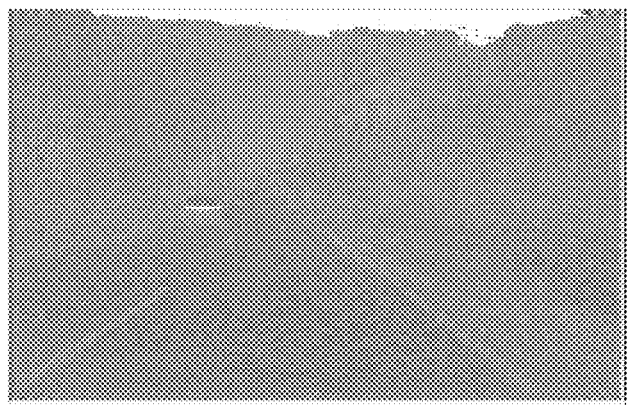
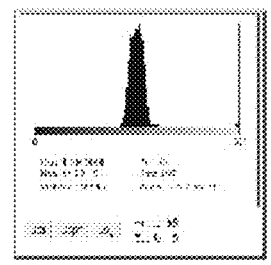
FIG.27B
AFTER OPERATION
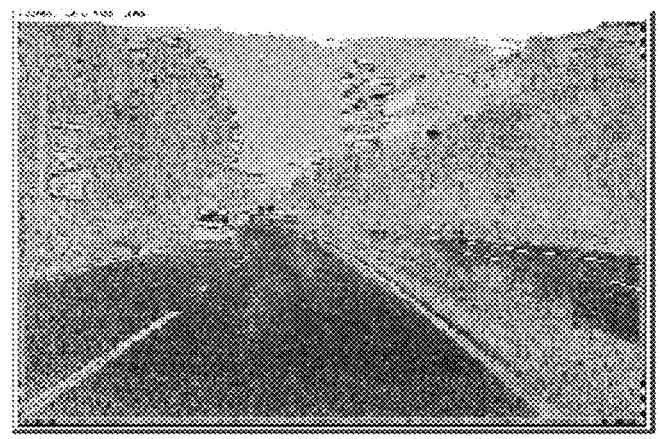
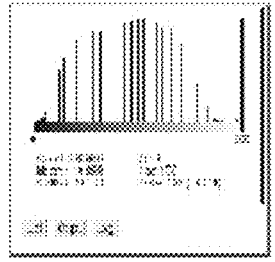

IMAGING APPARATUS, VEHICLE SYSTEM, AND IMAGE-PROCESSING METHOD FOR IMAGE MAGNIFICATION AND EXPANSION

CROSS-REFERENCE TO RELATED APPLICATIONS

The present application is based on and claims priority from Japanese Patent Application Numbers 2012-008934, filed Jan. 19, 2012, and 2012-236921, filed Oct. 26, 2012, the disclosures of which are hereby incorporated by reference herein in their entireties.

BACKGROUND

The present invention relates to an imaging apparatus that receives light from an imaging region by a light-receiving element array through an optical filter in which at least equal to or more than one type of a polarization filter part, or a color separation filter part is periodically arranged, and outputs an imaged image based on an image signal thus obtained, a vehicle system having the imaging apparatus, and an image-processing method.

This type of imaging apparatus is provided in a mobile object controller that performs mobile control of a mobile object such as a vehicle, a vessel, an air plane, or an industrial robot, an information supplier that supplies beneficial information to an operator (a driver) of the mobile object, and the like, and is widely used for an object identification operation.

In particular, for example, it is known that one is used for a vehicle travel support system such as ACC (Adaptive Cruise Control) for reduction of an operating load of a driver of a vehicle, and so on.

In such a vehicle travel support system, various functions are achieved such as an automatic brake function, or an alarm function that prevents a driver's vehicle from crashing into an obstacle or the like, and reduces an impact at the time of crashing, a vehicle speed-adjusting function that maintains a distance between a vehicle in front, a lane keep-assisting function that prevents a driver's vehicle from deviating from a traveling lane. Therefore, it is important to analyze an imaged image imaged around the driver's vehicle, and obtain various types of information showing a state around the driver's vehicle as precisely as possible. As the information showing the state around the driver's vehicle, for example, there are position information of various objects such as obstacles existing around the driver's vehicle, other vehicles, lane lines (white lines, Botts' dots, and the like), road-surface elements such as manhole covers and so on, road-side constructions such as guard rails and so on, road surface information showing whether a road surface is dry or wet, sunlight information showing whether it is a sunny side or a shady part, and the like.

A general imaging apparatus detects intensity of light (brightness information) from an imaging region, and obtains an imaged image based on the brightness information.

On the other hand, in order to detect (perform sensing) a shape, a material, a surface state of an object existing in the imaging region, an imaging apparatus that is capable of obtaining an imaged image (polarization information image) in which polarization information is reflected has attracted attention in recent years.

Such an imaging apparatus uses various types of partial polarization occurring by reflected light (specularly-reflected light, or diffusely-reflected light) from an object to which specifically-polarized light or non-polarized natural light is emitted, due to a geometric reason such as a direction of a surface of the object, an imaging position with respect to the object, or the like, a surface material of the object, and the like. With such an imaging apparatus, a two-dimensional distribution is obtained of a plurality of polarization components that are included in reflected light from an object in an imaging region, and their polarization directions are different to each other. And, by comparing a difference in magnitude among the polarization components included in light from the object in the imaging region, it is possible to obtain the position information of the various objects, the road surface information, the sunlight information, and the like that are difficult to obtain only from the brightness information with higher accuracy.

For example, Japanese Patent Application Publication number H11-175702 discloses an imaging apparatus in which an image sensor that images an image via a polarization filter that transmits only a vertical polarization component, and an image sensor that images an image via a horizontal polarization filter that transmits only a horizontal polarization component are arranged in parallel. In the imaging apparatus, from the former image sensor, an image signal of a vertical polarization image that expresses a two-dimensional distribution of the vertical polarization component included in the reflected light from the object in the imaging region is outputted, and from the latter image sensor, an image signal of a horizontal polarization image that expresses a two-dimensional distribution of the vertical polarization component included in the reflected light from the object in the imaging region is outputted.

In the imaging apparatus, as for the image signals of those of the vertical polarization image and the horizontal polarization image, after correcting displacement of a position due to parallax, a polarization ratio (index value) that indicates a ratio of intensity of vertical polarization to intensity of horizontal polarization per pixel is calculated, and a polarization ratio image (an index value image) in which the polarization ratio is taken as a pixel value is obtained.

By analyzing the polarization ratio image imaged by the imaging apparatus disclosed in Japanese Patent Application publication number H11-175702, it is possible to obtain the above-described various types of information such as the position information of the various objects, and the like. Additionally, from not only the polarization ratio image, but also an index value image having a pixel value based on an index value that indicates a difference of magnitude among polarization components included in light from each position in an imaging region, for example, an index value image in which a difference value among those polarization components, or a value that expresses a ratio of the difference value of those polarization components to a total value of those polarization components is taken as the index value, it is possible to obtain the above-described various information.

In order to analyze such an index value image and obtain various types of information in an imaging region with high accuracy, generally, contrast of the index value image (in other words, resolution of an index value) is important. However, in a conventional index value image, it is not possible to obtain sufficient contrast due to transmittance characteristics of a polarization filter. That is, there is a problem in that in order to accurately obtain various types of information in an imaging region, resolution of an image is insufficient. Hereinafter, regarding the problem, a case where a differential polarization degree that shows a ratio of a difference value of those polarization components to a total value of a vertical polarization component and a horizontal polarization component is taken as an index value will be explained specifically.

Generally, even if a transmittance characteristic of a vertical polarization filter (hereinafter, also referred to as "a P-polarization filter") that transmits a vertical polarization component (hereinafter, also referred to as "a P-polarization component") is high, 100% of the vertical polarization component of incident light is not transmitted, and it does not cut 100% of a horizontal polarization component (hereinafter, also referred to as "an S-polarization component") of the incident light. A horizontal polarization filter (hereinafter, also referred to as "an S-polarization filter") that transmits the horizontal polarization component does not transmit 100% of the horizontal polarization component of the incident light, and it does not cut 100% of the vertical polarization component. The following Table 1 shows a specific example of transmittance characteristics of actual S-polarization filter and P-polarization filter. The specific example shows a case where transmittance is measured when light of only the S-polarization component (100% S-polarization light), and light of only the P-polarization component (100% P-polarization light) are incident onto the S-polarization filter and the P-polarization filter, respectively. Note that each value in a bracket in the following Table 1 shows transmittance in a case where each filter has an ideal transmittance characteristic.

TABLE 1

|  | P-POLARIZATION FILTER | S-POLARIZATION FILTER |
|---|---|---|
| 100% P-POLARIZATION LIGHT | 78% (100%) | 32% (0%) |
| 100% S-POLARIZATION LIGHT | 17% (0%) | 64% (100%) |

As shown by using the brackets in the above Table 1, as for the P-polarization filter, it is ideal that transmittance of the P-polarization component be 100%, and transmittance of the S-polarization component be 0%. However, in fact, since the transmittance of the P-polarization component is 78%, the P-polarization component is not completely transmitted. Additionally, since the transmittance of the S-polarization component is 17%, the S-polarization component is not cut completely. This similarly applies to a case of the S-polarization filter.

In an imaging apparatus that obtains a differential polarization degree image (an index value image) having a pixel value based on a differential polarization degree by using a P-polarization filter and an S-polarization filter having the transmittance characteristics shown in the above Table 1, in the case where each of 100% P-polarization light and 100% S-polarization light having intensity of light equivalent to a maximum value of an effective amount of light received by an image sensor (light-receiving element) is incident, each signal value of an image signal outputted by the image sensor is shown in the following Table 2. Note that the signal value is 10-bit data, and a minimum value of the effective amount of the received-light is 0, and a maximum value of the effective amount of the light received is 1023. Additionally, each value in a bracket in the following Table 2 shows a signal value of an image signal that is outputted in a case where each filter has an ideal transmittance characteristic.

TABLE 2

|  | OUTPUT VALUE OF P-POLARIZATION FILTER | OUTPUT VALUE OF S-POLARIZATION FILTER |
|---|---|---|
| 100% P-POLARIZATION LIGHT | 1023 * 78/100 = 797 (1023) | 1023 * 32/100 = 327 (0) |
| 100% S-POLARIZATION LIGHT | 1023 * 17/100 = 173 (0) | 1023 * 64/100 = 654 (1023) |

As for a signal value outputted from an image sensor that receives the 100% P-polarization light via the P-polarization filter, an ideal signal value is 1023; however, transmittance of P-polarization light of the P-polarization filter is 78% as shown in the above Table 1, and therefore the signal value is 797. Likewise, as for a signal value outputted from an image sensor that receives the 100% S-polarization light via the S-polarization filter, an ideal signal value is 0; however, due to transmittance of S-polarization light of the S-polarization filter, the signal value is 327. Additionally, as for a signal value outputted from an image sensor that receives the 100% P-polarization light via the S-polarization filter, an ideal signal value is 0; however, due to transmittance of the P-polarization light of the S-polarization filter, the signal value is 173. Furthermore, as for a signal value outputted from an image sensor that receives the 100% S-polarization light via the S-polarization filter, an ideal signal value is 1023; however, due to transmittance of the S-polarization light of the S-polarization filter, the signal value is 654.

The following Table 3 shows results of each of a case where the 100% P-polarization light is incident and a case where the 100% S-polarization light is incident, and from signal values shown in the above Table 2, a total value (P+S) of a signal value P of the image signal via the P-polarization filter and a signal value S of the image signal via the S-polarization filter, and a difference value (P−S) in which the signal value S is subtracted from the signal value P are calculated. The total value (P+S) is never a value over 1023 in principle. This is because no matter how intense light is incident, a total of the P-polarization component and the S-polarization component cannot be over 100%. As shown in the following Table 3, the total value (P+S) in the case where the 100% P-polarization light is incident is a value over 1023, and therefore, here, it is rounded to 1023. Note that each value in brackets in the following Table 3 shows the total value (P+S) or the difference value (P−S) in the case where each filter has the ideal transmittance characteristic.

TABLE 3

|  | P + S | P − S |
|---|---|---|
| 100% P-POLARIZATION LIGHT | 797 + 327 = 1023 (1023) | 797 − 327 = 470 (1023) |
| 100% S-POLARIZATION LIGHT | 173 + 654 = 827 (1023) | 173 − 654 = −481 (−1023) |

The following Table 4 shows a differential polarization degree calculated from the total value (P+S) and the difference value (P−S) shown in the above Table 3. Note that each value in brackets in the following Table 4 shows a differential polarization degree in the case where each filter has the ideal transmittance characteristic.

TABLE 4

|  | DIFFERENTIAL POLARIZATION DEGREE |
|---|---|
| 100% P-POLARIZATION LIGHT | 470/1023 ≈ 0.46 (1) |
| 100% S-POLARIZATION LIGHT | −481/827 ≈ −0.58 (−1) |

The differential polarization degree is an index value that takes values in a range between equal to or more than −1 and less than or equal to 1 in the case where each filter has the ideal transmittance characteristic. However, an actual filter does not have such an ideal transmittance characteristic, but has the transmittance characteristic shown in the above Table 1. Therefore, in a case of using the actual filter that has the transmittance characteristic shown in the above Table 1, as shown in the above Table 4, a range that can be taken by the differential polarization degree is a range between equal to or more than −0.58 and less than or equal to 0.46, and it is narrower than the ideal one.

In a case of creating a differential polarization degree image of 1024 tones constituted by a 10-bit pixel value, the differential polarization degree (range between equal to or more than −1 and less than or equal to 1) is scaled to a pixel value of the differential polarization degree image (range between equal to or more than 0 and less than or equal to 1023). At this time, in a case where the range that can be taken by the differential polarization degree is a range between equal to or more than −0.58 and less than or equal to +0.46 as described above, and a range that can be taken by the pixel value of the differential polarization degree image is a range between equal to or more than 215 and less than or equal to 747, only a differential polarization degree image of 533 tones can be created. Therefore, contrast of the differential polarization degree image is low.

With respect to a problem in that the contrast of the differential polarization degree image is thus low, and image analysis accuracy is insufficient, the following solution is considered.

That is, a method is considered that performs an operation in which with respect to an image of a differential polarization degree image for one frame obtained by imaging an imaging region, a range of a pixel value included in the differential polarization degree image is expanded to a maximum range (range between equal to or more than 0 and less than or equal to 1023) that can be taken by the pixel value of the differential polarization degree image. In this method, the range of the pixel value included in the differential polarization degree image for one frame is defined, and magnification for expanding the pixel value included in the differential polarization degree image for one frame to the maximum range (range of an ideal index value) that can be taken by the pixel value of the differential polarization degree image is calculated, and by use of the calculated magnification, the range of the pixel value is expanded. Thus, a range of a pixel value after correction by the above expansion operation is expanded more than a range of a pixel value before correction, within a limit of not over the range of the ideal index value. Therefore, an image of a differential polarization degree having the pixel value after correction has contrast higher than an image of a differential polarization degree having a pixel value before correction.

However, regardless of the range of the pixel value before correction, when magnification for expanding the range of the pixel value to the maximum range that can be taken by the pixel value of the differential polarization degree image is calculated, and the expansion operation is performed by the magnification, the following problem occurs. As described above, by the transmittance characteristic that each filter has, the range that can be taken by the pixel value before correction is limited to a predetermined range (range of an effective index value) calculated from the transmittance characteristic (limited to an effective range between equal to or more than 215 and less than or equal to 747, in an example of the above Table 4). Therefore, if the expansion operation by using effective magnification in order to enlarge at least this effective range (215-747) to an ideal range (0-1023) is performed, an appropriate pixel value in the effective range (pixel value before correction) is not a pixel value that is out of the ideal range (pixel value after correction) after performing the expansion operation, and an excess expansion operation is not performed. Accordingly, in principle, at least, by using effective magnification corresponding to the effective range (215-747) calculated from the transmittance characteristic of the filter, the excess expansion operation is not performed, and it is possible to increase the contrast of the differential polarization degree image.

However, in fact, where an image signal includes noise, and so on, there is a case where the pixel value (pixel value before correction) that is out of the effective range (215-747) is calculated.

In this case, magnification calculated based on the range of the pixel value before correction becomes lower than the effective magnification. As a result, in principle, even though it is possible to perform an expansion operation at equal to or more than the effective magnification at minimum, the magnification is suppressed by the existence of an inappropriate pixel value that is out of the effective range. Therefore, the expansion operation of an appropriate pixel value (pixel value before correction) included in the effective range is insufficient, and a problem occurs in that an index value image of high contrast is not able to be obtained.

SUMMARY

An object of the present invention to provide an imaging apparatus that obtains an index value image of high contrast even in a case where an inappropriate index value that cannot be calculated in principle exists when outputting an index value image having a pixel value based on an index value that shows a difference in magnitude of a plurality of different optical components that are different to each other included in light from each position in an imaging region, a vehicle system having the imaging apparatus, and an image-processing method.

In order to achieve the above object, an embodiment of the present invention provides an imaging apparatus, comprising: an imaging device that receives light from each position in an imaging region through an optical filter in which a plurality of types of selective filter regions that selectively transmits optical components different to each other are periodically arranged, or an optical filter in which at least equal to or more than one type of selective filter region that selectively transmits a specific optical component, and a non-selective filter region that directly transmits incident light are periodically arranged, and outputs an image signal in accordance with a received-light amount per filter region on the optical filter; and an image processor that outputs an index value image having a pixel value based on an index value that indicates a difference in magnitude of a plurality of optical components different to each other included in the light from each position in the imaging region, based on the image signal outputted from the imaging device, the image processor including: a magnification calculator that calculates magnification to expand a range of an index value before correction calculated based on an image signal corresponding to one index value image outputted from the imaging device as a range of the index value to a maximum range of an ideal index value that can be taken by the index value, or a vicinity of that, in a case where the filter regions on the optical filter have ideal transmittance characteristics; an expansion operation device that performs an expansion operation such that the index value before correction used as a pixel value of the one index value image outputted from the image processor is corrected by use of magnification calculated by the magnification calculator, and a range of an index value after correction becomes the range of the ideal index value, or a vicinity of that; and an effective magnification storage that stores effective magnification so as to expand a maximum range of an effective index value that can be taken by the index value before correction calculated from transmittance characteristics of the filter regions on the optical filter have to the range of the ideal index value, or a vicinity of that, wherein the expansion operation device performs the expansion operation by use of the effective magnification stored in the effective magnification storage, in a case where the magnification calculated by the magnification calculator is smaller than the effective magnification stored in the effective magnification storage.

In order to achieve the above object, an embodiment of the present invention provides an image-processing method of an imaging apparatus, including: an imaging device that receives light from each position in an imaging region through an optical filter in which a plurality of types of selective filter regions that selectively transmits optical components different to each other are periodically arranged, or an optical filter in which at least equal to or more than one type of selective filter region that selectively transmits a specific optical component, and a non-selective filter region that directly transmits incident light are periodically arranged, and outputs an image signal in accordance with a received-light amount per filter region on the optical filter; and an image processor that outputs an index value image having a pixel value based on an index value that indicates a difference in magnitude of a plurality of optical components different to each other included in the light from each position in the imaging region, based on the image signal outputted from the imaging device; the image-processing method comprising the steps of: magnification calculation that calculates that calculates magnification to expand a range of an index value before correction calculated based on an image signal corresponding to one index value image outputted from the imaging device as a range of the index value to a maximum range of an ideal index value that can be taken by the index value, or a vicinity of that, in a case where the filter regions on the optical filter have ideal transmittance characteristics; an expansion operation that performs an expansion operation such that the index value before correction used as a pixel value of the one index value image outputted from the image processor is corrected by use of magnification calculated in the magnification calculation, and a range of an index value after correction becomes the range of the ideal index value, or a vicinity of that; wherein in the step of the expansion operation, in a case where the magnification calculated in the step of the magnification calculation is smaller than an effective magnification to expand a range of a maximum effective index value that can be taken by the index value before correction calculated from the transmittance of the filter regions on the optical filter, the expansion operation is performed by use of the effective magnification.

BRIEF DESCRIPTION OF THE DRAWINGS

FIG. 12A is a cross-sectional diagram along a dashed-line A-A in FIG. 11 schematically illustrating the filter part for the vehicle detection of the optical filter and the image sensor. FIG. 12B is a cross-sectional diagram along a dashed-line B-B in FIG. 11 schematically illustrating the filter part for the vehicle detection of the optical filter and the image sensor.

Each of FIGS. 24A to 24E is an example of a shape of a histogram of a pixel value of an image of a differential polarization degree (before correction) obtained by actual imaging.

Figure 25:
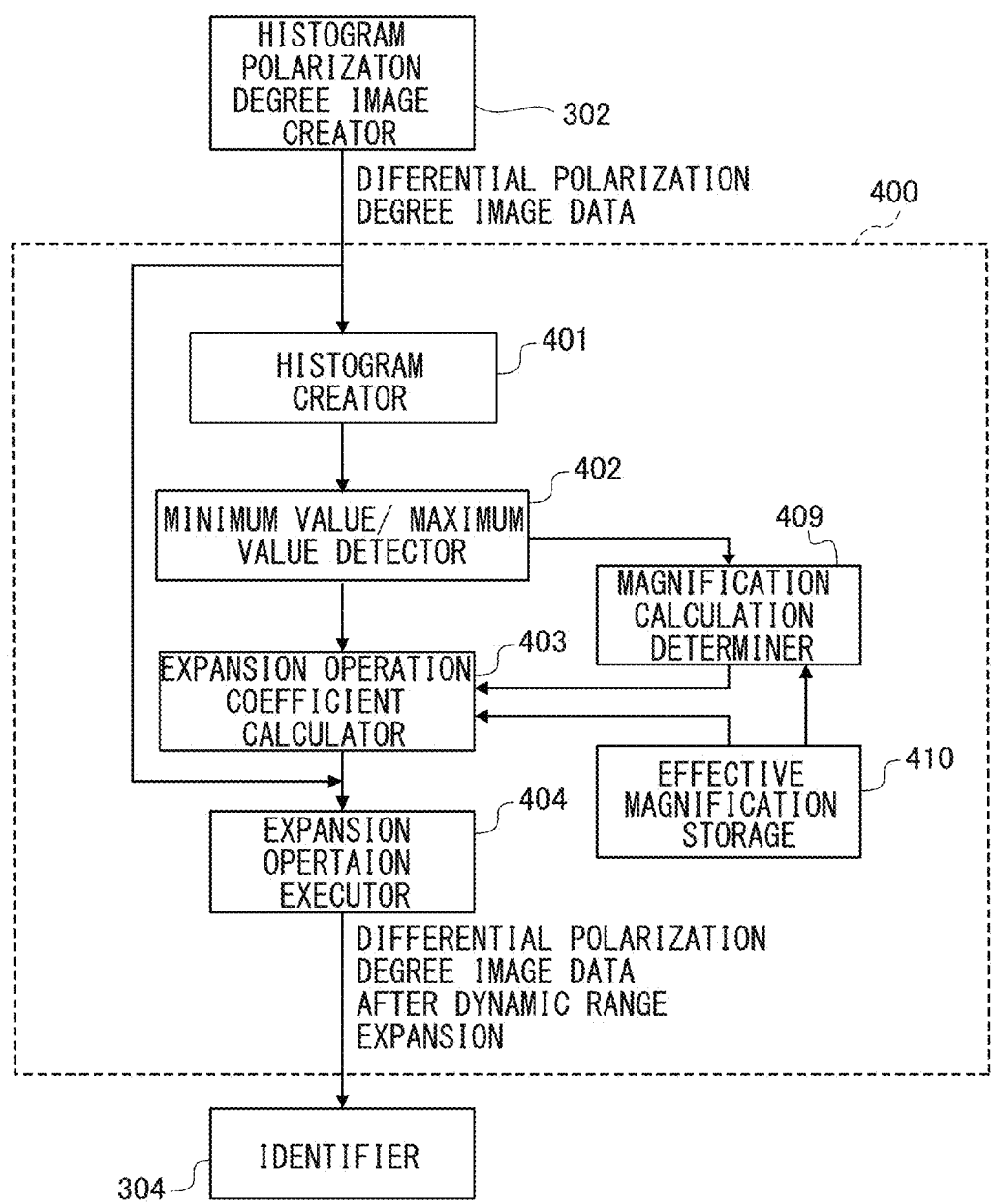

FIG. 25 is a functional block diagram of the dynamic range expander in Modified Example 2.

Figure 26:
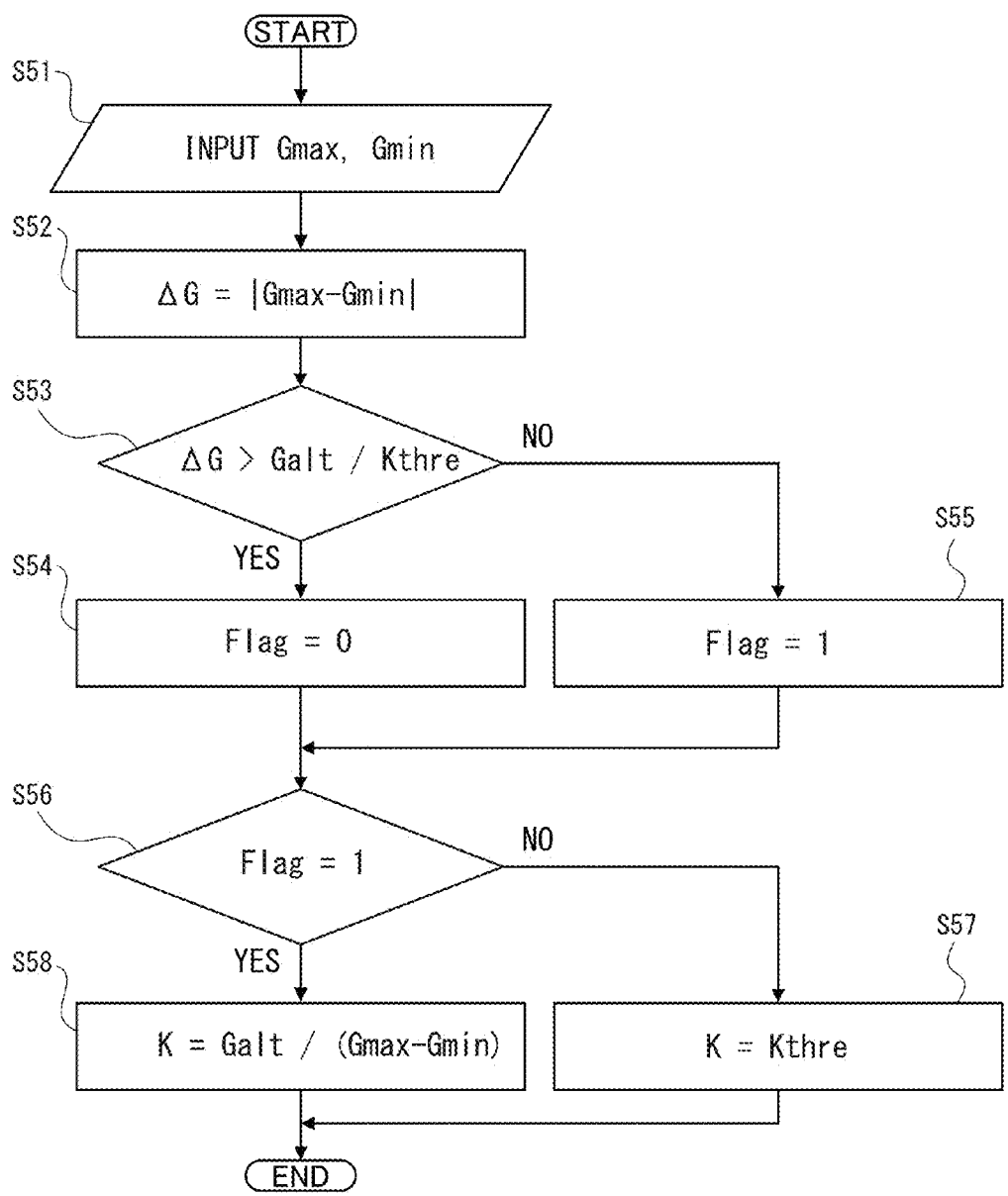

FIG. 26 is a flow diagram illustrating a flow of a dynamic range expansion operation in a magnification calculation determiner, and an expansion operation coefficient calculator of the dynamic range expander in Modified Example 2.

FIG. 27A illustrates a differential polarization degree image and a histogram of a pixel value of the above image, when the dynamic range expansion operation is not performed (before operation). FIG. 27B illustrates a differential polarization degree image and a histogram of a pixel value of the above image, when the dynamic range expansion operation is performed (after operation).

Figure 28:
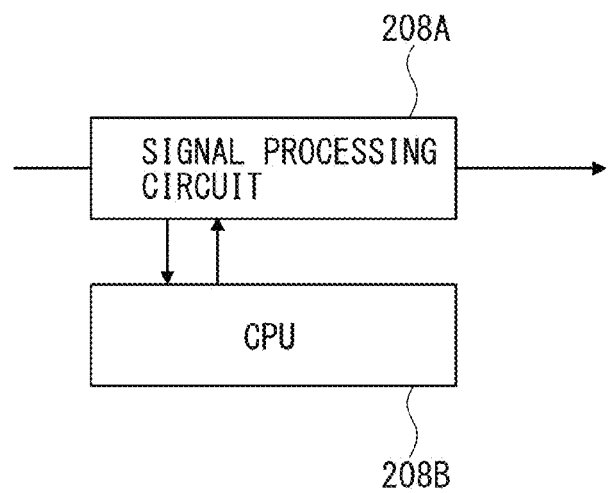

FIG. 28 is a block diagram illustrating an example of a structure of a signal processor when a dynamic range expansion operation is performed in the imaging unit.

Figure 29:
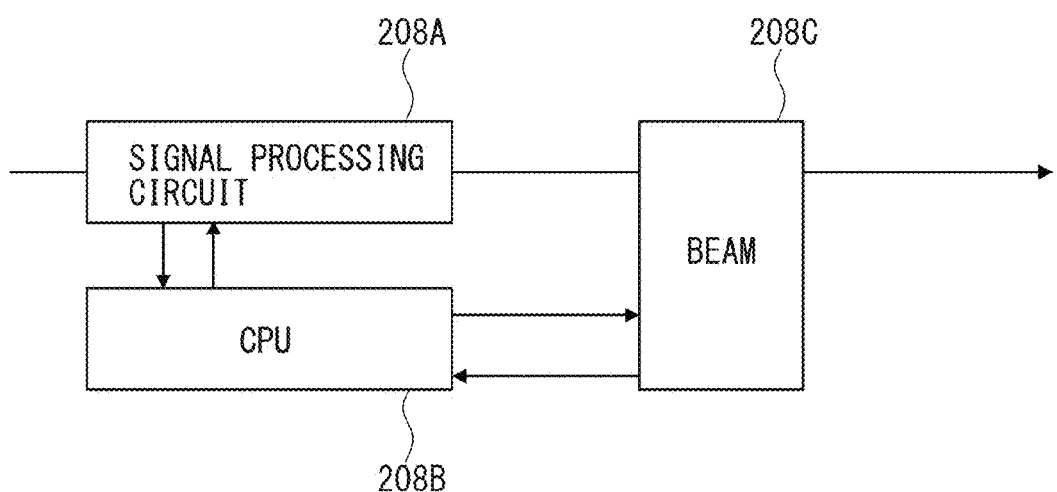

FIG. 29 is a block diagram illustrating a diagram of another example of a structure of a signal processor, when a dynamic range expansion operation is performed in the imaging unit.

DETAILED DESCRIPTION OF THE PREFERRED EMBODIMENTS

Hereinafter, an imaging apparatus used in an in-vehicle device control system as a vehicle system according to an embodiment of the present invention will be explained. Note that the imaging apparatus according to the embodiment of the present invention is applicable for not only the in-vehicle device control system, but also another system equipped with an object detection device that performs an object detection based on an imaged image, for example.

Figure 1:
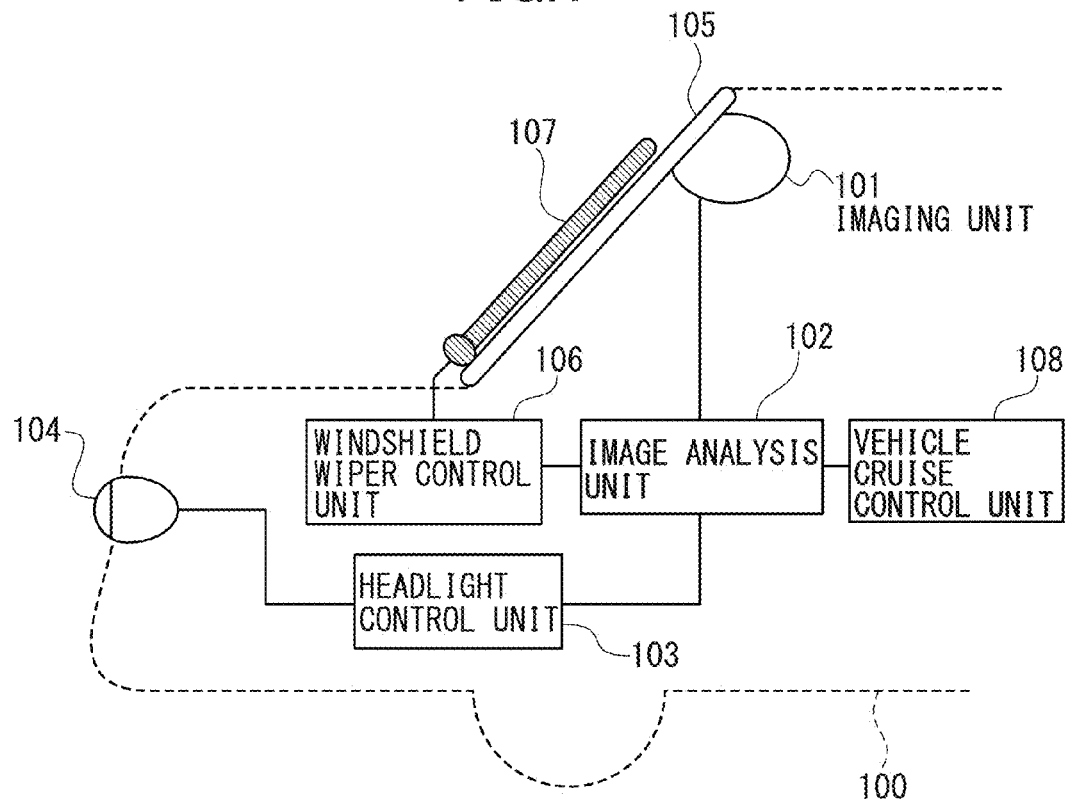
FIG. 1 is a schematic structure diagram of an in-vehicle device control system according to an embodiment of the present invention.

FIG. 1 is a schematic structure diagram of an in-vehicle device control system according to the embodiment of the present invention.

The in-vehicle device control system, by use of imaged image data of a front region in a travelling direction of a driver's vehicle (imaging region) imaged by an imaging unit as an imaging device included in a driver's vehicle 100, or the like, performs light distribution control of a headlight, drive control of a windshield wiper, and control of another in-vehicle device.

The imaging apparatus included in the in-vehicle device control system according to the embodiment is provided in an imaging unit 101, and images a front region in a travelling direction of a driver's vehicle 100 as an imaging region. An imager 200 of the imaging unit 101 is placed around a rearview mirror (not illustrated) of a front window 105 of the driver's vehicle 100. Imaged image data imaged by the imager 200 of the imaging unit 101 is inputted to an image analysis unit 102 as an image-processing device. The image analysis unit 102 analyzes imaged image data transmitted from the imager 200, calculates a position, direction, and distance of another vehicle existing in front of the driver's vehicle 100, detects attached matter such as a raindrop or attached matter attached on the front window 105, and detects an object to be detected such as a white line in a road-side part and on a road surface (road marking line) that exists in the imaging region. In a case of detection of another vehicle, by identifying a taillight of another vehicle, it is possible to detect a vehicle in front that travels in the same travelling direction as the driver's vehicle 100, and by identifying a headlight of another vehicle, it is possible to detect an oncoming vehicle that travels in a direction opposite to the driver's vehicle 100.

A calculation result of the image analysis unit 102 is sent to a headlight control unit 103. The headlight control unit 103 generates a control signal that controls a headlight 104, which is an in-vehicle device of the driver's vehicle 100, from distance data calculated by the image analysis unit 102, for example. Specifically, for example, a switching control of high and low beams of the headlight 104, and a partial light blocking control of the headlight 104 are performed such that prevention of dazzling of a driver of another vehicle is performed by preventing intense light of the headlight 104 of the driver's vehicle 100 from being incident to the eyes of the driver of a vehicle in front, or an oncoming vehicle, and security of a field of view of a driver of the driver's vehicle 100 is achieved.

The calculation result of the image analysis unit 102 is also sent to a windshield wiper control unit 106. The windshield wiper control unit 106 controls a windshield wiper 107 to remove attached matter such as a raindrop, foreign matter, or the like attached on the front window 105 of the driver's vehicle 100. The windshield wiper control unit 106 receives a foreign matter detection result detected by the image analysis unit 102, and generates a control signal that controls the windshield wiper 107. When the control signal generated by the windshield wiper control unit 106 is sent to the windshield wiper 107, the windshield wiper 107 is operated so as to secure the field of vision of the driver of the driver's vehicle 100.

Additionally, the calculation result of the image analysis unit 102 is also sent to a vehicle cruise control unit 108. The vehicle cruise control unit 108 informs the driver of the driver's vehicle 100 of a warning, and performs a cruise support control such as control of a steering wheel or a brake of the driver's vehicle 100, in a case where the driver's vehicle 100 is out of a lane region marked by a white line or a road side based on a detection result of the road side and the white line detected by the image analysis unit 102.

Figure 2:
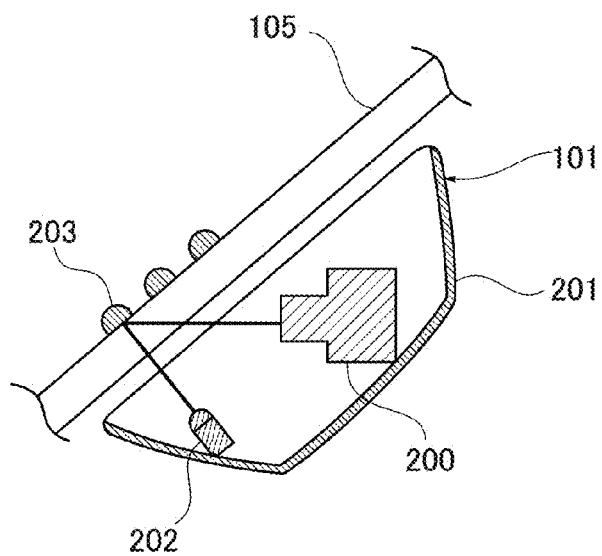
FIG. 2 is a schematic structure diagram of an imaging unit in the in-vehicle device control system.

FIG. 2 is a schematic structure diagram of the imaging unit 101.

Figure 3:
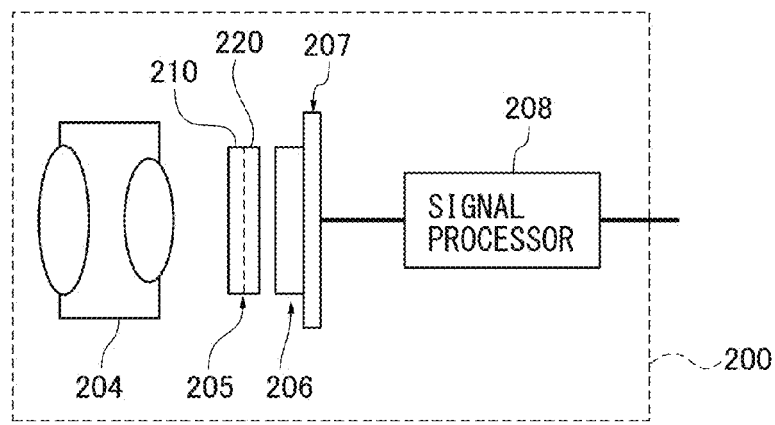
FIG. 3 is a schematic structure diagram of an imager included in the imaging unit.

FIG. 3 is a schematic structure diagram of the imager 200 included in the imaging unit 101.

The imaging unit 101 includes the imager 200, a light source 202, and a casing 201 that stores those described above. The imaging unit 101 is arranged on an inner surface side of the front window 105 of the driver's vehicle 100. The imager 200, as illustrated in FIG. 3, includes an imaging lens 204, an optical filter 205, a sensor substrate 207 including an image sensor 206 having a two-dimensionally-arranged pixel array, and a signal processor 208 that generates imaged image data in which an analog electric signal (an amount of received light received by each light-receiving element on the image sensor 206) outputted from the sensor substrate 207 is converted to a digital electric signal and outputs it. The light source 202 emits light toward the front window 105 and is arranged such that when the light is reflected by an outer surface of the front window 105, the reflected light is incident to the imager 200.

In the present embodiment, the light source 202 is for detection of attached matter attached on the outer surface of the front window 105 (hereinafter, an example of a case where the attached matter is a raindrop will be explained.). In a case where a raindrop 203 is not attached on the outer surface of the front window 105, the light emitted from the light source 202 is reflected by an interfacial surface between the outer surface of the front window 105 and air, and the reflected light is incident to the imager 200. On the other hand, as illustrated in FIG. 2, in a case where the raindrop 203 is attached on the outer surface of the front window 105, a refractive index difference between the outer surface of the front window 105 and the raindrop 203 is smaller than that between the outer surface of the front window 105 and the air. Therefore, the light emitted from the light source 202 is transmitted through the interfacial surface between the outer surface of the front window 105 and the raindrop 203, and is not incident to the imaging device 200. Due to this difference, detection of the raindrop 203 attached on the front window 105 is performed from imaged image data by the imaging part 200.

Additionally, in the present embodiment, as illustrated in FIG. 2, the imager 200 and the light source 202 of the imaging unit 101 are covered by a casing 201 with the front window 105. Thus, by being covered by the casing 201, even if the inner surface of the front window 105 is foggy, it is possible to suppress a state where the front window 105 covered by the imaging unit 101 is foggy. Therefore, it is possible to suppress a state where the image analysis unit 102 mistakenly performs analysis due to fog on the front window 105, and appropriately performs various control operations based on an analysis result of the image analysis unit 102.

However, in a case where the fog on the front window 105 is detected from the imaged image data by the imager 200, and, for example, an air conditioner control of the driver's vehicle 100 is performed, a path through which the air flows may be formed in a part of the casing 201 such that a part of the front window 105 facing the imager 200 becomes the same state as other parts.

Here, in the present embodiment, a focus position of the imaging lens 204 is set to infinity, or between infinity and the front window 105. Therefore, not only in a case of performing detection of the raindrop attached on the front window 105, but also in a case of performing detection of a vehicle in front, or an oncoming vehicle, or detection of a white line, it is possible to obtain appropriate information from the imaged image data by the imager 200.

For example, in a case of performing the detection of the raindrop 203 attached on the front window 105, since a shape of an image of the raindrop 203 in the imaged image data is often a round shape, a shape identification operation is performed which determines whether a raindrop candidate image in the imaged image data is in a round shape, and the raindrop candidate image is identified as the image of the raindrop. In a case of performing such a shape identification operation, there is a case where the imaging lens 204 is in focus on infinity or between infinity and the front window 105 as described above is slightly out of focus compared with a case where the imaging lens 204 is in focus on the raindrop 203 on the outer surface of the front window 105, which makes a shape identification rate of the raindrop (round shape) higher, and a raindrop detection performance is high.

However, in the case where the imaging lens 204 is in focus on infinity, when identifying a taillight of a vehicle in front travelling in the distance, there is a case where the number of light-receiving elements that receive light of the taillight on the image sensor 206 is approximately one. Details will be described later; however, in this case, there is a risk that the light of the taillight is not received by a red color light-receiving element that receives a color of the taillight (red color), and therefore, the taillight is not identified, and the vehicle in front is not detected. In a case of avoiding such a risk, it is preferable to focus the imaging lens 204 on a side nearer than infinity. Thus, the taillight of the vehicle in front travelling in the distance is out of focus; therefore, it is possible to increase the number of light-receiving elements that receive the light of the taillight, and the accuracy in identification of the taillight increases, and accuracy in detection of the vehicle in front improves.

A light-emitting diode (LED), a laser diode (LD), or the like can be used for the light source 202 of the imaging unit 101. Additionally, as an emission wavelength of the light source 202, for example, visible light, or infrared light can be used. However, in a case of preventing a driver of an oncoming vehicle, a pedestrian, or the like from being dazzled by the light of the light source 202, it is preferable to select a wavelength that is longer than the visible light, and in a range of a light-receiving sensitivity of the image sensor 206, for example, a wavelength of an infrared light region that is equal to or more than 800 nm and less than or equal to 1000 nm. The light source 202 of the present embodiment emits light having the wavelength of the infrared light region.

Here, in a case of imaging infrared wavelength light emitted from the light source 202 and reflected by the front window 105 by the imager 200, the image sensor 206 of the imager 200 also receives a large amount of ambient light including infrared wavelength light such as sunlight, for example, in addition to the infrared wavelength light emitted from the light source 202. Therefore, in order to identify the infrared wavelength light emitted from the light source 202 from such a large amount of ambient light, it is necessary to sufficiently increase a light emission amount of the light source 202 compared with the ambient light. However, there are many cases where it is difficult to use a light source 202 having such a large light emission amount.

Figure 4:
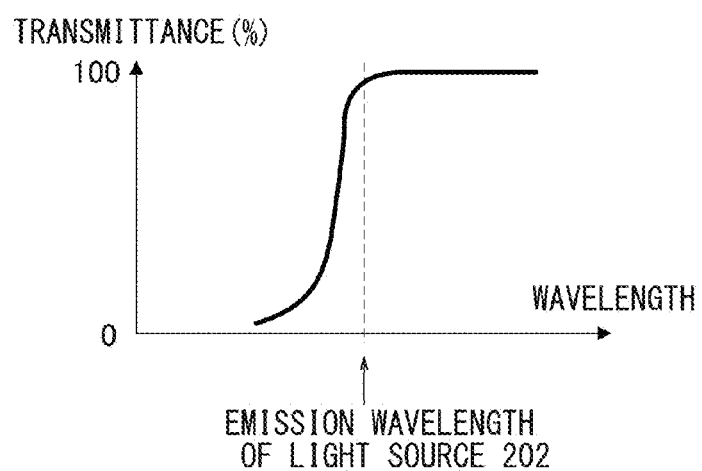
FIG. 4 is a graph showing a filter characteristic of a cut filter applicable for imaged image data for a raindrop detection.
Figure 5:
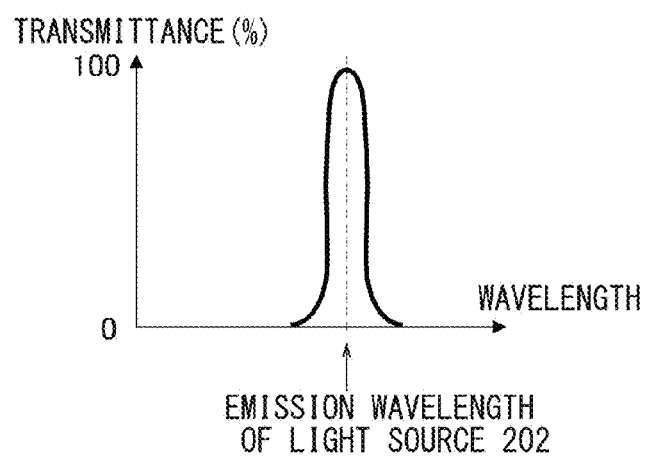
FIG. 5 is a graph showing a filter characteristic of a band-pass filter applicable for imaged image data for a raindrop detection.

Accordingly, the present embodiment is structured such that the image sensor 206 receives the light emitted from the light source 202, for example, via a cut filter so as to cut light of shorter wavelength than an emission wavelength of the light source 202 as illustrated in FIG. 4, or via a bandpass filter where a peak of transmittance approximately corresponds to the emission wavelength of the light source 202 as illustrated in FIG. 5. Thus, it is possible to receive the light emitted from the light source 202 to remove light other than the emission wavelength of the light source 202, and an amount of light emitted from the light source 202 and received by the image sensor 206 relatively increases with respect to the ambient light. As a result, it is possible to identify the light emitted from the light source 202 from the ambient light, without using the light source 202 of the large light emission amount.

However, in the present embodiment, from the imaged image data, not only the detection of the raindrop 203 on the front window 105, but also the detection of the vehicle in front, or the oncoming vehicle, and the detection of the white line are performed. Therefore, if a wavelength range other than the infrared wavelength light emitted from the light source 202 is removed from an entire imaged image, it is not possible to receive light in a wavelength range that is necessary to perform the detection of the vehicle in front, or the oncoming vehicle, and the detection of the white line, which interferes with those detections. Accordingly, in the present embodiment, an image region of the imaged image data is divided into an image region for a raindrop detection to detect the raindrop 203 on the front window 105, and an image region for a vehicle detection to perform the detection of the vehicle in front, or the oncoming vehicle, and the detection of the white line, and a filter that removes the wavelength range other than the infrared wavelength light emitted from the light source 202 only from a part corresponding to the image region for the raindrop detection is arranged at the optical filter 205.

Figure 6:
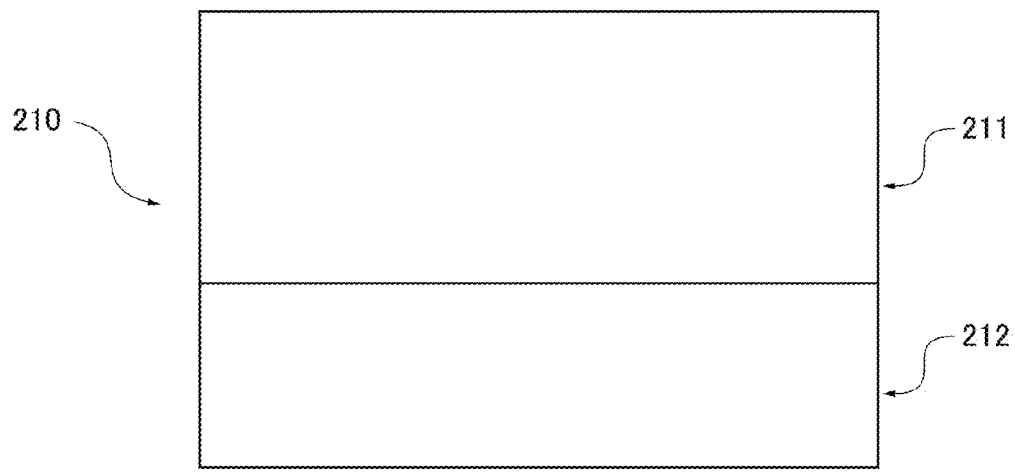
FIG. 6 is a front view of a front filter included in an optical filter of the imager.

FIG. 6 is a front view of a front filter 210 provided at the optical filter 205.

Figure 7:
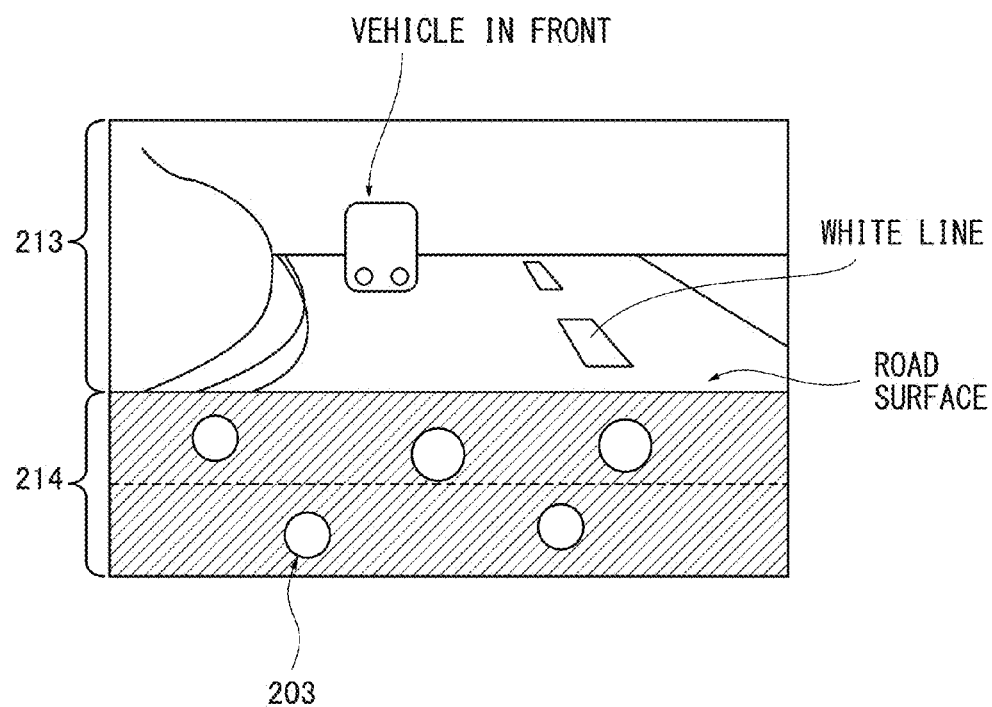
FIG. 7 is an explanatory diagram illustrating an example of an image of imaged image data by the imager.

FIG. 7 is an explanatory diagram illustrating an example of an image of imaged image data.

As illustrated in FIG. 3, the optical filter 205 of the present embodiment has the front filter 210 and a rear filter 220, and has a structure such that they are layered in a light transmission direction. As illustrated in FIG. 6, the front filter 210 is divided into an infrared light cut filter region 211 arranged in a part corresponding to an upper part, ⅔ of the imaged image that is an image region for a vehicle detection 213, and an infrared light transmission filter region 212 arranged in a part corresponding to a lower part, ⅓ of the imaged image that is an image region for a raindrop detection 214. In the infrared light transmission filter region 212, the cut filter illustrated in FIG. 4, or the bandpass filter illustrated in FIG. 5 is used.

Images of a headlight of an oncoming vehicle, a taillight of a vehicle in front, a road side and a white line often exist in the upper part of the imaged image, and in the lower part of the imaged image, an image of a nearest road surface in front of the driver's vehicle 100 normally exists. Therefore, necessary information for identification of the headlight of the oncoming vehicle, the taillight of the vehicle in front, the road side, and the white line are concentrated in the upper part of the imaged image, and the lower part of the imaged image is not so important for the identification of those. Therefore, in a case where both the detection of the oncoming vehicle, the vehicle in front, the road side, and the white line, and the detection of the raindrop are performed from single imaged image data, as illustrated in FIG. 7, the lower part of the imaged image is taken as the image region for the raindrop detection 214, and the rest, the upper part, of the imaged image is taken as the image region for the car detection 213, and it is preferable to divide the front filter 210 into regions corresponding to the above.

When inclining an imaging direction of the imager 200 downward, there is a case where a hood of the driver's vehicle 100 is captured in the lower part of the imaging region. In this case, sunlight reflected by the hood of the driver's vehicle 100, the taillight of the vehicle in front, or the like becomes ambient light, which is included in the imaged image data, and becomes a cause of a false identification of the headlight of the oncoming vehicle, the taillight of the vehicle in front, and the white line. Even in such a case, in the present embodiment, in the part corresponding to the lower part of the imaged image, the cut filter illustrated in FIG. 4, or the bandpass filter illustrated in FIG. 5 is arranged, and therefore the ambient light such as the sunlight reflected by the hood, the taillight of the vehicle in front, or the like is removed. Accordingly, the accuracy in identification of the headlight of the oncoming vehicle, the taillight of the vehicle in front, and the white line is improved.

Here, in a case of detecting a vehicle in front, the detection of the vehicle in front is performed by identifying a taillight of the vehicle in front in the imaged image. However, a light amount of the taillight is smaller than that of a headlight of an oncoming vehicle, and lots of ambient light such as a street lamp and the like exist, and therefore it is difficult to detect the taillight accurately only from mere brightness data. Accordingly, spectral information is used for the identification of the taillight, and it is necessary to identify the taillight based on a received-light amount of red light. In the present embodiment, as described later, at the rear filter 220 of the optical filter 205, a red-color filter, or a cyan filter corresponding to a color of the taillight (a filter that transmits only a wavelength range of the color of the taillight) is arranged, and the received-light amount of the red light is detected.

However, each light-receiving element constituting the image sensor 206 of the present embodiment has sensitivity with respect to light in an infrared wavelength range. Therefore, when the image sensor 206 receives the light including the infrared wavelength range, an obtained imaged image may be entirely a reddish one. As a result, there is a case where it is difficult to identify a red color image part corresponding to the taillight. Therefore, in the present embodiment, in the front filter 210 of the optical filter 205, a part corresponding to the image region for the car detection 213 is taken as the infrared light cut filter region 211. Thus, the infrared wavelength range is removed from an imaged image data part used for identification of the taillight, and the accuracy in identification of the taillight is improved.

As illustrated in FIG. 3, light from an imaging region including a photographic subject (object to be detected), through the imaging lens 204, is transmitted through the optical filter 205, and converted to an electric signal in accordance with intensity of the light by the image sensor 206. When the electric signal (analog signal) outputted from the image sensor 206 is inputted to the signal processor 208, from the electric signal, the signal processor 208 outputs a digital signal that shows brightness (luminance) of each pixel on the image sensor 206 as imaged image data, with horizontal and vertical synchronization signals of the image to the following unit.

Figure 8:
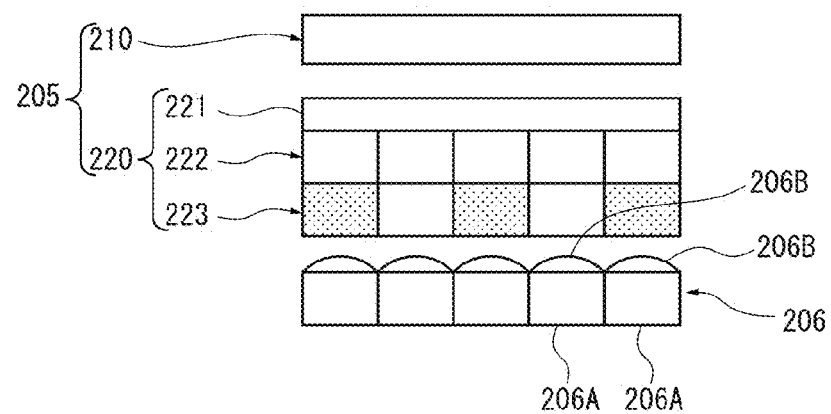
FIG. 8 is a schematic enlarged view of the optical filter and an image sensor of the imager when viewed from a direction perpendicular to a light transmission direction.

FIG. 8 is an enlarged schematic diagram of the optical filter 205 and the image sensor 206 when viewed from a direction perpendicular to a light transmission direction.

The image sensor 206 is an image sensor using a CCD (Charge-Coupled Device), a CMOS (Complementary Metal-Oxide Semiconductor), or the like, and as a light-receiving element of which, a photodiode 206A is used. The photodiode 206A is two-dimensionally arranged in an array manner per pixel, and in order to increase a light collection efficiency of the photodiode 206A, a micro lens 206B is provided on an incident side of each photodiode 206A. The image sensor 206 is connected on a PWB (Printed Wiring Board) by a wire bonding method, or the like, and the sensor substrate 207 is formed.

On a side of the micro lens 206B of the image sensor 206, the optical filter 205 is closely arranged. The rear filter 220 of the optical filter 205 has a layer structure in which a polarization filter layer 222 and a spectral filter layer 223 are sequentially formed on a transparent filter substrate 221, as illustrated in FIG. 8. Each region of the polarization filter layer 222 and the spectral filter layer 223 is correspondingly divided into one photodiode 206A on the image sensor 206.

Between the optical filter 205 and the image sensor 206, an air gap can be disposed. However, the optical filter 205 is closely in contact with the image sensor 206, so that it is easy to conform a boundary of each region of the polarization filter layer 222 and the spectral filter layer 223 of the optical filter 205 to a boundary among the photodiode 206A on the image sensor 206. The optical filter 205 and the image sensor 206, for example, can be bonded with a UV adhesive agent, or a quadrilateral region outside of an effective pixel range using imaging can be bonded by a UV adhesion or a thermal compression bonding in a state of being supported by a spacer outside of the effective pixel range.

Figure 9:
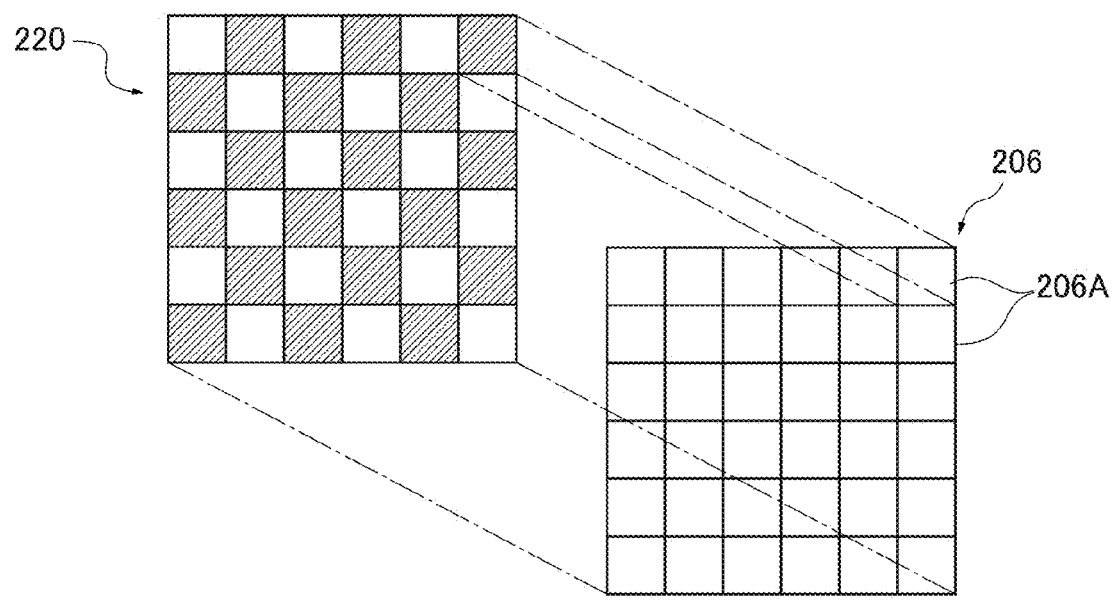
FIG. 9 is an explanatory diagram illustrating region division patterns of a polarization filter layer and a spectral filter layer of the optical filter.

FIG. 9 is an explanatory diagram illustrating region division patterns of the polarization filter layer 222 and the spectral filter layer 223 of the optical filter 205.

With respect to each of the polarization filter layer 222 and the spectral filter layer 223, each of two types of regions of first and second regions is correspondingly arranged on one photodiode 206A on the image sensor 206, respectively.

Thus, it is possible to obtain a received-light amount received by each photodiode 206A on the image sensor 206 as polarization information, spectral information, or the like, in accordance with the types of the regions of the polarization filter layer 222 and the spectral filter layer 223 through which the received light transmits.

Note that the present embodiment is explained assuming that the image sensor 206 is an imaging element for a monochrome image; however, the image sensor 206 can be constituted by an imaging element for a color image. In a case where the image sensor 206 is constituted by the imaging element for the color image, a light transmission characteristic of each region of the polarization filter layer 222 and the spectral filter layer 223 can be adjusted in accordance with a characteristic of a color filter attached to each imaging pixel of the imaging element for the color image.

Here, an example of the optical filter 205 in the present embodiment will be explained.

Figure 10:
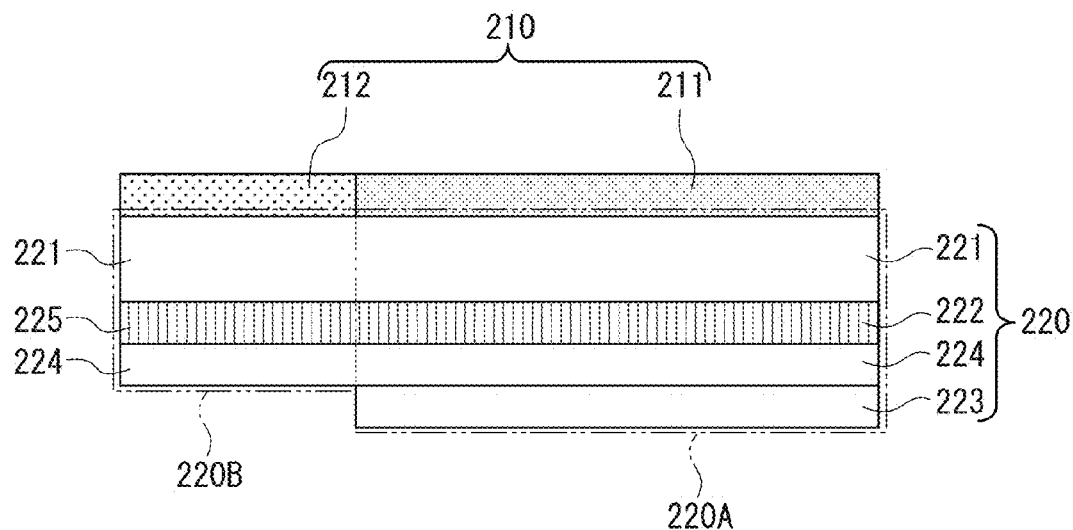
FIG. 10 is a cross-sectional diagram schematically illustrating a layer structure of the optical filter of the imager.

FIG. 10 is a cross-sectional diagram schematically illustrating a layer structure of the optical filter 205 in the present embodiment.

In the rear filter 220 of the optical filter 205 in the present embodiment, layer structures of a filter part for the vehicle detection 220A corresponding to the image region for the car detection 213 and a filter part for the raindrop detection 220B corresponding to the image region for the raindrop detection 214 are different. In particular, the filter part for the car detection 220A has the spectral filter layer 223, but the filter part for the raindrop detection 220B does not have the spectral filter layer 223. In addition, a structure of the polarization filter layer 222 of the filter part for the vehicle detection 220A and a structure of the polarization filter layer 225 of the filter part for the raindrop detection 220B are different.

Figure 11:
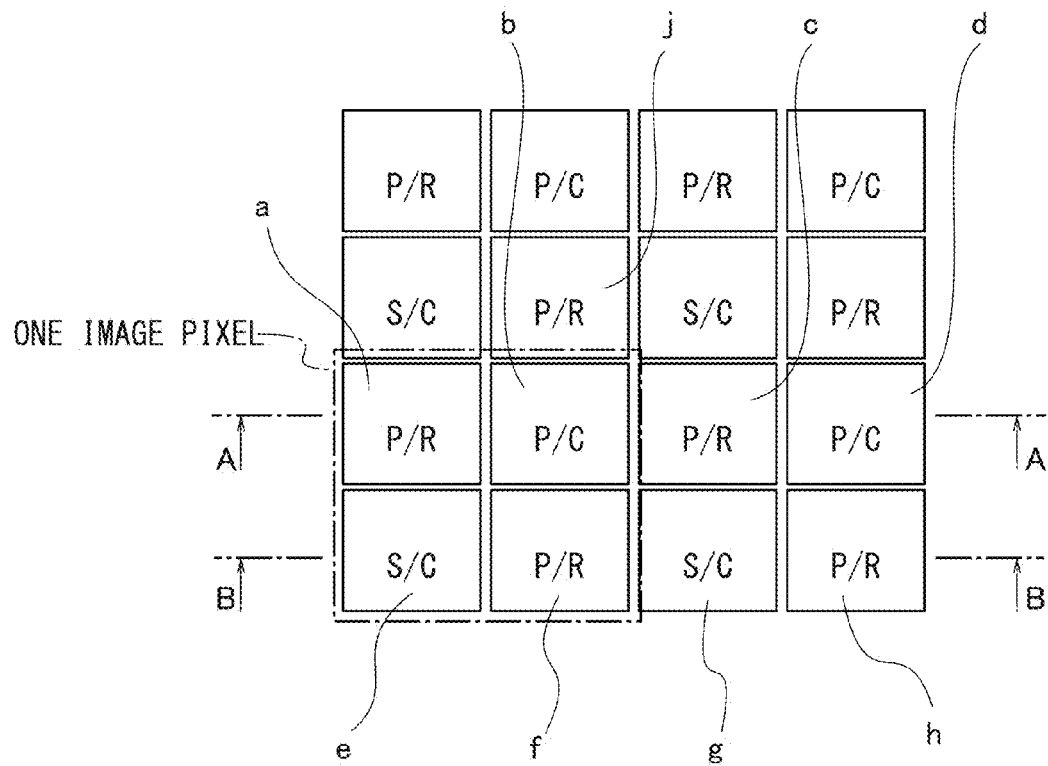
FIG. 11 is an explanatory diagram illustrating contents of information (information of each imaging pixel) corresponding to an amount of light that is transmitted through a filter part for a vehicle detection of the optical filter, and received by each photodiode on an image sensor.

FIG. 11 is an explanatory diagram illustrating contents of information (information of each imaging pixel) corresponding to an amount of light that is transmitted through the filter part for the vehicle detection 220A of the optical filter 205 and received by each photodiode 206A on the image sensor 206 in the present embodiment.

FIG. 12A is a cross-sectional diagram along a dashed-line A-A in FIG. 11 schematically illustrating the filter part for the vehicle detection 220A of the optical filter 205 and the image sensor 206. FIG. 12B is a cross-sectional diagram along a dashed-line B-B in FIG. 11 schematically illustrating the filter part for the vehicle detection 220A of the optical filter 205 and the image sensor 206.

The filter part for the vehicle detection 220A of the optical filter 205 in the present embodiment has a layer structure where the polarization filter layer 222 is formed on the transparent filter substrate 221, and then the spectral filter layer 223 is formed on the polarization filter layer 222, as illustrated in FIGS. 12A and 12B. The polarization filter layer 222 has a wire grid structure, and an upper surface in a layer direction (downside surface in FIGS. 12A and 12B) of the polarization filter layer 222 is a corrugated surface. On such a corrugated surface, if the spectral filter layer 223 is formed directly, the spectral filter layer 223 is formed along the corrugated surface, and there is a case where unevenness of a layer thickness of the spectral filter layer 223 occurs, and original spectral performance is not obtained. Therefore, as for the optical filter 205 in the present embodiment, an upper surface side in the layer direction of the polarization filter layer 222 is filled with a filler 224 and flattened, and then the spectral filter layer 223 is formed on the filler 224.

A material of the filler 224 can be a material that does not affect a function of the polarization filter layer 222, the corrugated surface of which is flattened by the filler 224. Therefore, in the present embodiment, a material without a polarization function is used. In addition, as a flattening operation using the filler 224, for example, a method of applying the filler 224 by a spin-on-glass method can be suitably adopted; however, it is not limited thereto.

In the present embodiment, the first region of the polarization filter layer 222 is a vertical polarization region that selects and transmits only a vertical polarization component that oscillates parallel to a vertical row (vertical direction) of imaging pixels of the image sensor 206, and the second region of the polarization filter layer 222 is a horizontal polarization region that selects and transmits only a horizontal polarization component that oscillates parallel to a horizontal row (horizontal direction) of imaging pixels of the image sensor 206. Additionally, the first region of the spectral filter layer 223 is a red-color spectral region that selects and transmits only light of a red-color wavelength range (specific wavelength range) included in a used wavelength range that is transmittable through the polarization filter layer 222, and the second region of the spectral filter layer 223 is a non-spectral region that transmits light without performing a wavelength selection. In the present embodiment, as shown surrounded by a heavy dashed-line in FIG. 11, one image pixel of imaged image data is constituted by a total of four imaging pixels (four imaging pixels denoted by reference signs a, b, e, f) of two adjacent vertical and two adjacent horizontal imaging pixels.

The imaging pixel "a" illustrated in FIG. 11 receives light transmitted through the vertical polarization region (first region) of the polarization filter layer 222 and the red-color spectral region (first region) of the spectral filter layer 223 of the optical filter 205. Therefore, the imaging pixel "a" receives light P/R of the red-color wavelength range (denoted by reference sign R in FIG. 11) of the vertical polarization component (denoted by reference sign P in FIG. 11). The imaging pixel "b" illustrated in FIG. 11 receives light transmitted through the vertical polarization region (first region) of the polarization filter layer 222 and the non-spectral region (second region) of the spectral filter layer 223 of the optical filter 205. Therefore, the imaging pixel "b" receives light P/C of non-spectral light (denoted by reference sign C in FIG. 11) of the vertical polarization component P. The imaging pixel "e" illustrated in FIG. 11 receives light transmitted through the horizontal polarization region (second region) of the polarization filter layer 222 and the non-spectral region (second region) of the spectral filter layer 223 of the optical filter 205. Therefore, the imaging pixel "e" receives light S/C of the non-spectral light C of the horizontal polarization component (denoted by reference sign S in FIG. 11). The imaging pixel "f" illustrated in FIG. 11 receives light transmitted through the vertical polarization region (first region) of the polarization filter layer 222 and the red-color spectral region (first region) of the spectral filter layer 223 of the optical filter 205. Therefore, the imaging pixel "f" receives light P/R of the red-color wavelength range R of the vertical polarization component P as well as the imaging pixel "a".

By the above-described structure, according to the present embodiment, one image pixel with respect to an image of the vertical polarization component of the red light is obtained from output signals of the imaging pixel "a" and the imaging pixel "f", one image pixel with respect to an image of the vertical polarization component of the non-spectral light is obtained from an output signal of the imaging pixel "b", and one image pixel with respect to an image of the horizontal polarization component of the non-spectral light is obtained from an output signal of the imaging pixel "e". Therefore, according to the present embodiment, a single imaging operation makes it possible to obtain three kinds of imaged image data, namely, the image of the vertical polarization component of the red light, the image of the vertical polarization component of the non-spectral light, and the image of the horizontal polarization component of the non-spectral light.

Note that in the above imaged image data, the number of image pixels is smaller than the number of imaging pixels. However, in a case of obtaining a higher-resolution image, a generally-known image interpolation operation can be used. For example, in a case of obtaining the image of the vertical polarization component of the red light having higher resolution, with respect to image pixels corresponding to the imaging pixel "a" and the imaging pixel "f", information of the vertical polarization component P of the red light received by those imaging pixels "a, and f" is directly used, and with respect to an image pixel corresponding to the imaging pixel "b", for example, an average value of the imaging pixels "a, c, f, and j" surrounding around the imaging pixel "b" is used as information of the vertical polarization component of the red light of the image pixel. In addition, in the case of obtaining the image of the horizontal polarization component of the non-spectral light having higher resolution, with respect to an image pixel corresponding to the imaging pixel "e", information of the horizontal polarization component S of the non-spectral light received by the imaging pixel "e" is directly used, and with respect to image pixels corresponding to the imaging pixels "a, b, and f", an average value of the imaging pixel "e", the imaging pixel "g", or the like that receives the horizontal polarization component of the non-spectral light surrounding around the imaging pixels "a, b, and f" is used, and the same value as the imaging pixel "e" can be used.

The image of the vertical polarization component of the red light thus obtained, for example, can be used for identification of a taillight. The horizontal polarization component S is cut in the image of the vertical polarization component of the red light; therefore, it is possible to obtain a red color image in which an ambient factor due to the red light in which the horizontal polarization component S is intense as red light reflected by a road surface, red light (reflected light) from a dashboard in an interior of the driver's vehicle 100, or the like is suppressed. Accordingly, by using the image of the vertical polarization component of the red light for the identification of the taillight, the identification rate of the taillight is improved.

In addition, the image of the vertical polarization component of the non-spectral light can be used for an identification of a white line, or a headlight of an oncoming vehicle, for example. The horizontal polarization component S is cut in the image of the vertical polarization component of the non-spectral light; therefore, it is possible to obtain a non-spectral image in which an ambient factor due to white light in which the horizontal polarization component S is intense as white light reflected by a road surface, white light (reflected light) from a dashboard in an interior of the driver's vehicle 100, or the like is suppressed. Accordingly, by using the image of the vertical polarization component of the non-spectral light for the identification of the white line, or the headlight of the oncoming vehicle, those identification rates are improved. In particular, it is generally known that on a road in the rain, there are many horizontal polarization components S in reflected light from a wet road surface. Accordingly, by using the image of the vertical polarization component of the non-spectral light for the identification of the white line, it is possible to appropriately identify the white line on the wet road surface, and the identification rates are improved.

Additionally, if using an index value image in which an index value in which each pixel value is compared between the image of the vertical polarization component of the non-spectral light and the image of the horizontal polarization component of the non-spectral light is taken as a pixel value, as described later, highly-accurate identification of a metal object in the imaging region, a wet/dry condition of a road surface, a three-dimensional object in the imaging region, and the white line on the road in the rain is possible. As the index value image used here, for example, a difference image in which a difference value of the pixel values between the image of the vertical polarization component of the non-spectral light and the image of the horizontal polarization component of the non-spectral light is taken as a pixel value, a ratio image (polarization ratio image) in which a ratio of the pixel values between those images is taken as a pixel value, a differential polarization degree image in which a ratio (differential polarization degree) of the difference value of the pixel values between those images with respect to a total pixel value between those images is taken as a pixel value, or the like can be used.

However, as for the polarization ratio image, in a case where a value of a polarization component in a denominator (for example, P-polarization component) shows a value around zero, the polarization ratio becomes a value closer to infinity, and it is not possible to obtain an accurate value. And, as for the differential polarization degree image, in a case where a total value of a P-polarization component and an S-polarization component in a denominator shows a value around zero, the differential polarization degree becomes a value closer to infinity, and it is not possible to obtain an accurate value. However, in a case of comparing the polarization ratio image and the differential polarization degree image, the differential polarization degree image has a lower probability of taking a value around zero in a denominator, and has a higher probability of calculating an accurate value.

Additionally, as for the polarization ratio image, in a case where the value of the polarization component in the denominator (for example, P-polarization component) shows a value around zero, it is not possible to calculate an accurate value; however, as for a polarization component in a numerator (for example, S-polarization component), even in a case where a value of the polarization component in the numerator shows a value around zero, it is possible to calculate an accurate value. Therefore, the polarization ratio image is a suitable index value image, in a case of detecting the polarization component in the numerator (for example, S-polarization component).

On the other hand, as for the differential polarization degree image, in a case where the total value of the P-polarization component and the S-polarization component in the denominator shows a value around zero, either a value of the P-polarization component or a value of the S-polarization component shows a value around zero. A probability in which the value of the P-polarization component shows a value around zero and a probability in which the value of the S-polarization component shows a value around zero are equal, and therefore, it can be said that the differential polarization degree image is an index value image that equally detects the P-polarization component and the S-polarization component. In the present embodiment, from the above comparison, not the polarization ratio image but the differential polarization degree image is used as the index value image.

In the present embodiment, each of the infrared light cut filter region 211 and the infrared light transmission filter region 212 constituting the front filter 210 is formed by multilayer films having different layer structures. As a production method of such a front filter 210, there is a method such that after filming a part of the infrared light transmission filter region 212 by vacuum deposition, or the like, covering a mask with the part of the infrared light cut filter region 211, and then covering the part of the infrared light transmission filter region 212 with the mask, a part of the infrared light cut filter 211 is filmed by the vacuum deposition, or the like.

Additionally, in the present embodiment, each of the polarization filter layer 222 of the filter part for the vehicle detection 220A and the polarization filter layer 225 of the filter part for the raindrop detection 220B has a wire grid structure that is regionally divided in a two-dimensional direction; however, the former polarization filter layer 222 is one in which two types of regions (vertical polarization region and horizontal polarization region) in which transmission axes are perpendicular to each other are regionally divided by an imaging pixel unit, and the latter polarization filter layer 225 is one in which one type of a region having a transmission axis that transmits only the vertical polarization component P is regionally divided by an imaging pixel unit. In a case of forming the polarization filters 222, 225 having such different structures on the same filter substrate 221, for example, by adjusting a groove direction of a template (equivalent to a pattern) performing a patterning of a metal wire having a wire grid structure, adjustment of a longitudinal direction of the metal wire of each region is easy.

Note that in the present embodiment, the optical filter 205 is not provided with the infrared light cut filter region 211, but the imaging lens 204 can be provided with the infrared light cut filter region 211, for example. In this case, production of the optical filter 205 is easy.

Additionally, in place of the infrared light cut filter region 211, a spectral filter layer that transmits only the vertical polarization component P can be formed in the filter part for the raindrop detection 220B of the rear filter 220. In this case, it is not necessary to form the infrared light cut filter region 211 in the front filter 210.

In addition, as for the optical filter 205 in the present embodiment, the rear filter 220 having the polarization filter layer 222 and the spectral filter layer 223 that are regionally divided as illustrated in FIG. 11 is provided closer to a side of the image sensor 206 than the front filter 210; however, the front filter 210 can be provided closer to the side of the image sensor 206 than the rear filter 220.

Next, a flow of a detection operation of a vehicle in front and an oncoming vehicle in the present embodiment will be explained.

Figure 13:
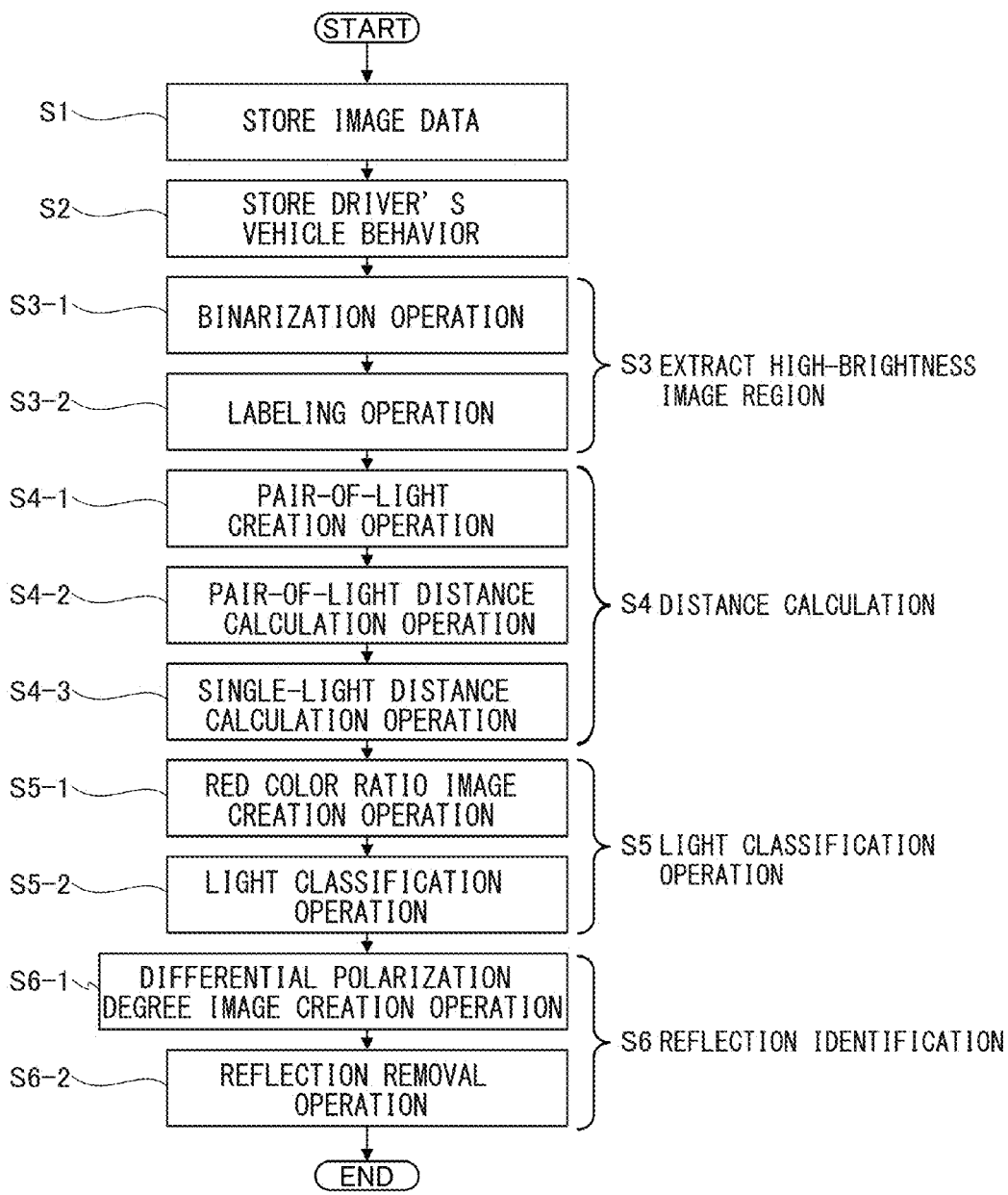
FIG. 13 is a flow diagram illustrating a flow of a vehicle detection operation in an embodiment of the present invention.

FIG. 13 is a flow diagram illustrating a flow of a vehicle detection operation in the present embodiment.

In the vehicle detection operation of the present embodiment, image processing is performed on image data imaged by the imager 200, and an image region considered to be an object to be detected is extracted. And, by identifying whether a type of a light source shown in the image region is either of two types of objects to be detected, the detection of the vehicle in front and the oncoming vehicle is performed.

Firstly, in step S1, image data in front of the driver's vehicle 100 imaged by the image sensor 206 of the imager 200 is stored in a memory. The image data includes a signal that shows brightness in each imaging pixel of the image sensor 206, as described above. Next, in step S2, information regarding a behavior of the driver's vehicle 100 is obtained from a vehicle behavior sensor (not illustrated).

In step S3, a high-brightness image region considered to be the object to be detected (a taillight of the vehicle in front and a headlight of the oncoming vehicle) is extracted from the image data stored in the memory. The high-brightness image region is a bright region having higher brightness than a predetermined threshold brightness in the image data, and there usually is a case where there are a plurality of high-brightness regions, and all of those are extracted. Therefore, in this step, an image region showing reflected light from a wet road surface is also extracted as a high-brightness region.

In a high-brightness image region extraction operation, firstly, in step S3-1, a binarization operation is performed by comparing a brightness value of each imaging pixel on the image sensor 206 and the predetermined threshold brightness. Specifically, "1" is allocated to a pixel having brightness equal to or higher than the predetermined threshold brightness, and "0" is allocated to a pixel other than the above, and a binarized image is created. Next, in step S3-2, in the binarized image, in a case where pixels to which "1" is allocated are adjacent, a labeling operation that identifies those pixels as one high-brightness image region is performed. Thus, a collection of a plurality of adjacent pixels having a high-brightness value is extracted as one high-brightness image region.

In step S4 that is performed after the above high-brightness image region extraction operation, a distance between an object in the imaging region corresponding to each extracted high-brightness image region and the driver's vehicle 100 is calculated. In this distance calculation operation (step S4), a pair-of-light distance calculation operation (step S4-2) that detects a distance by using light of a vehicle that is a left-and-right pair of lights, and a single-light distance calculation operation (step S4-3) where in the case of a long distance, each one of the left-and-right pair of lights is not distinctively identified and the left-and-right pair of lights is identified as a single light are performed.

Firstly, for the pair-of-light distance calculation operation, in step S4-1, a pair-of-light creation operation that creates a pair of lights is performed. In the image data imaged by the imager 200, the left-and-right pair of lights satisfies a condition where each one of the left-and-right pair of lights is adjacent, and at a position of an approximately same height, each area of the high-brightness image region is approximately the same, and each shape of the high-brightness image region is the same. Therefore, two of high-brightness image regions that satisfy such a condition are taken as a pair of lights. A high-brightness image region that is not taken as the pair of lights is considered to be a single light. In a case where a pair of lights is created, by the pair-of-light distance calculation operation in step S4-2, a distance to the pair of lights is calculated. A distance between left and right headlights and a distance between left and right taillights of a vehicle are approximated by a constant value "w0" (for example, about 1.5 m). On the other hand, since a focal length "f" in the imager 200 is known, by calculating a distance between left and right lights "w1" on the image sensor 206 of the imager 200, an actual distance "x" to the pair of lights is calculated by a simple proportion calculation (x=f·w0/w1). Note that for a distance detection to the vehicle in front and the oncoming vehicle, a special distance sensor such as a laser radar, a millimeter-wave radar, or the like can be used.

In step S5, spectral information as an index value, which is a ratio (red color brightness ratio) of a red color image of the vertical polarization component P to a white color image of the vertical polarization component P, is used, and from the spectral information, a light-type identification operation that identifies the two of high-brightness image regions taken as the pair of lights by light from a headlight, or light from a taillight is performed. In the light-type identification operation, firstly, in step S5-1, with respect to the high-brightness image region taken as the pair of lights, a red color ratio image (index value image) in which a ratio of pixel data corresponding to the imaging pixels "a, f" on the image sensor 206 to pixel data corresponding to the imaging pixel "b" on the image sensor 206 is taken as a pixel value is created (red color ratio image creation operation). And then, in step S5-2, a light classification operation where the pixel value of the red color ratio image is compared to a predetermined threshold value, a high-brightness image region in which the pixel value is equal to or more than the predetermined threshold value is taken as a taillight image region by the light from the taillight, and a high-brightness image region in which the pixel value is less than the predetermined threshold value is taken as a headlight image region by the light from the headlight is performed.

Note that the spectral information that has been explained here is an example where a red color brightness ratio is taken as the index value; however, another index value such as a differential polarization degree, a ratio of a difference value of pixel values between the red color image of the vertical polarization component P and the white color image of the vertical polarization image P to a total value of pixel values between the red color image of the vertical polarization component P and the white color image of the vertical polarization image P, or the like is used.

And then, in step S6, with respect to each image region identified as the taillight image region and the headlight image region, by using a differential polarization degree ((S−P)/(S+P)) as polarization information, a reflection identification operation that identifies direct light from the taillight or the headlight, or reflected light reflected by a mirror surface part of the wet road surface and received or the like is performed. In the reflection identification operation, firstly in step S6-1, with respect to the taillight image region, the differential polarization degree ((S−P)/(S+P)) is calculated, and a differential polarization degree image (index value image) where the calculated differential polarization degree is taken as a pixel value is created. And likewise, with respect to the headlight image region, the differential polarization degree ((S−P)/(S+P)) is calculated, and a differential polarization degree image where the calculated differential polarization degree is taken as a pixel value is created (differential polarization degree image creation operation). And in step S6-2, a reflection removal operation where a pixel value of each differential polarization degree image is compared to a predetermined threshold value, a taillight image region and a headlight image region in which the pixel value is equal to or more than the predetermined threshold value is determined to be an image region by the reflected light, each image region by the reflected light is taken as an image region which does not show the taillight of the vehicle in front, or the headlight of the oncoming vehicle, and is removed is performed. The taillight image region and the headlight image region that remain after the above removal operation are identified as an image region that shows the taillight of the vehicle in front, or an image region that shows the headlight of the oncoming vehicle.

Note that only in a case where a car is equipped with a rain sensor, and the rain sensor determines that it is raining, can the above reflection identification operation S6 be performed. Additionally, only in a case where a windshield wiper is operated by a driver can the above reflection identification operation S6 be performed. In short, the above reflection identification operation S6 can be performed only at the time of raining when reflection by a wet road surface is assumed.

A detection result of the vehicle in the front and the oncoming vehicle detected by the above-described vehicle detection operation is used for a light distribution control of a headlight as an in-vehicle device of the driver's vehicle 100 in the present embodiment. In particular, in a case of detecting a taillight of a vehicle in front by the vehicle detection operation, and moving closer to a range of a distance where illumination light of the headlight of the driver's vehicle 100 is incident to a rearview mirror of the vehicle in front, the control that blocks a part of the headlight of the driver's vehicle 100, and shifts a direction of the illumination light of the headlight of the driver's vehicle 100 in an up-and-down direction or a right-and-left direction is performed such that the illumination light of the headlight of the driver's vehicle 100 does not strike the vehicle in front. In addition, in a case of detecting a headlight of an oncoming vehicle by the vehicle detection operation, and moving closer to a range of a distance where illumination light of the headlight of the driver's vehicle 100 strikes a driver of the oncoming vehicle, the control that blocks a part of the headlight of the driver's vehicle 100, and shifts a direction of the illumination light of the headlight of the driver's vehicle 100 in an up-and-down direction or a right-and-left direction is performed such that the illumination light of the headlight of the driver's vehicle 100 does not strike the oncoming vehicle.

[White Line Detection Operation]

Hereinafter, a white line detection operation in the present embodiment will be explained.

In the present embodiment, for the purpose of preventing the driver's vehicle 100 from deviating from a travelling region, the operation that detects a white line (road marking line) as an object to be detected is performed. The term "white line" here includes all types of road marking white lines such as solid lines, dashed lines, dotted lines, double lines, and the like. Note that likewise, road marking lines of colors other than white such as yellow and the like are also detectable.

In the white line detection operation of the present embodiment, among the information obtainable from the imaging unit 101, polarization information by comparison of the horizontal polarization component S of the white color component (non-spectral light) with the vertical polarization component P of that, for example, a differential polarization degree ((S−P)/(S+P)) of the horizontal polarization component S of the white color component (non-spectral light) and the vertical polarization component P of that can be used. As for reflected light from the white line, generally, a diffuse reflection component is dominant. Therefore, the vertical polarization component P and the horizontal polarization component S of the reflected light are approximately equal, and the differential polarization degree shows a value close to zero. On the other hand, on an asphalt surface part where the white line is not formed, when it is dry, a characteristic shows that the diffuse reflection component is dominant, and a differential polarization degree of which shows a positive value. Additionally, on the asphalt surface part where the white line is not formed, when it is wet, a specular reflection component is dominant, a difference polarization degree of which shows a larger value. Therefore, it is possible to determine a part where an obtained differential polarization value on the road surface part is smaller than a predetermined threshold value to be the white line.

Hereinafter, an expansion operation to increase contrast of an index value image, which is a characterizing portion of an embodiment of the present invention, will be explained.

In the above explanation, various index value images have been explained; however, in the following explanation, an example of a differential polarization degree image having a pixel value corresponding to a differential polarization degree (index value) used in the above white line detection operation, or the like will be explained.

Figure 14:
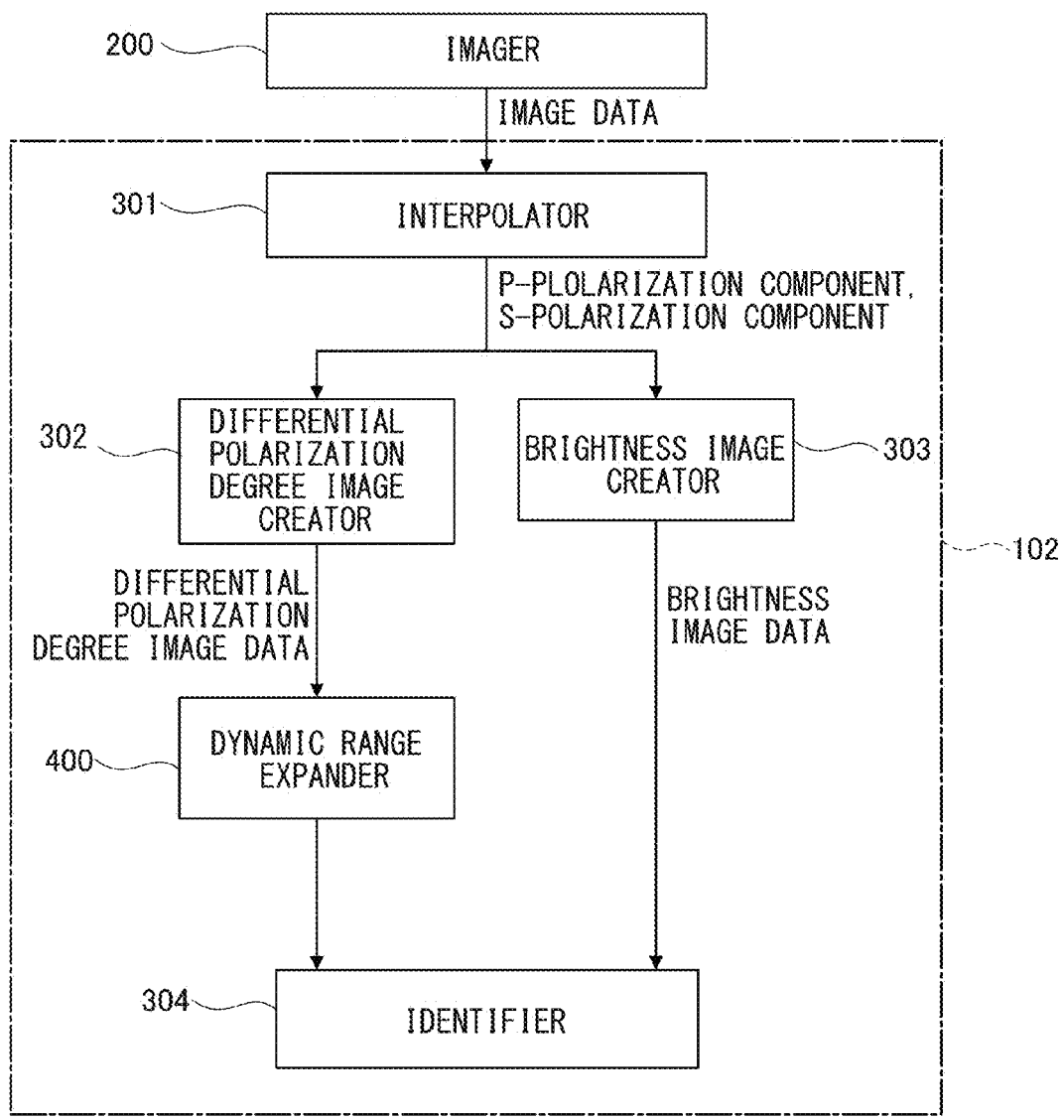
FIG. 14 is a functional block diagram of an image analysis unit.

FIG. 14 is a functional block diagram of the image analysis unit 102.

The image analysis unit 102 of the embodiment of the present invention mainly includes an interpolator 301, a differential polarization degree image creator 302, a brightness image creator 303, a dynamic range expander 400, and an identifier 304.

The interpolator 301 resolves image data outputted from the imager 200 into image data of three types of optical components, namely, image data of the vertical polarization component (P/R) of the red light, image data of the vertical polarization component (P/C) of the non-spectral light, and image data of the horizontal polarization component (S/C) of the non-spectral light, and performs the above image interpolation operation on each image data.

The differential polarization degree image creator 302 obtains the vertical polarization component (P/C) of the non-spectral light and the horizontal polarization component (S/C) of the non-spectral light of the image data outputted from the interpolator 301. And, per pixel, the differential polarization degree image creator 302 calculates a differential polarization degree (range of equal to or more than −1 and less than or equal to 1) of the non-spectral light from the vertical polarization component (P/C) of the non-spectral light and the horizontal polarization component (S/C) of the non-spectral light. Then, the differential polarization degree image creator 302 converts the calculated differential polarization degree to a 10-bit pixel value (integer range of equal to or more than 0 and less than or equal to 1023), and performs a differential polarization degree image creation operation that creates differential polarization degree image data.

The brightness image creator 303 obtains the vertical polarization component (P/C) of the non-spectral light and the horizontal polarization component (S/C) of the non-spectral light of the image data outputted from the interpolator 301. And, per pixel, the brightness image creator 303 calculates non-spectral brightness in which the vertical polarization component (P/C) of the non-spectral light and the horizontal polarization component (S/C) of the non-spectral light are added. And then, the brightness image creator 303 converts the calculated non-spectral brightness to a 10-bit pixel value (integer range of equal to or more than 0 and less than or equal to 1023), and performs a brightness image creation operation that creates brightness image data. The brightness image data thus obtained is used for the above high-brightness image region extraction operation performed by the identifier 304, and so on.

The dynamic range expander 400 receives the differential polarization degree image data outputted from the differential polarization degree image creator 302, and performs a dynamic range expansion operation (scaling operation) that expands a dynamic range (of a pixel value) of the differential polarization degree image data. By this operation, the dynamic-range-expanded differential polarization degree image data is sent to the identifier 304. Note that hereinafter, for an explanation, differential polarization degree image data after performing the dynamic range expansion operation is called "differential polarization degree image data after correction", and differential polarization degree image data before performing the dynamic range expansion operation is called "differential polarization degree image data before correction".

Figure 15:
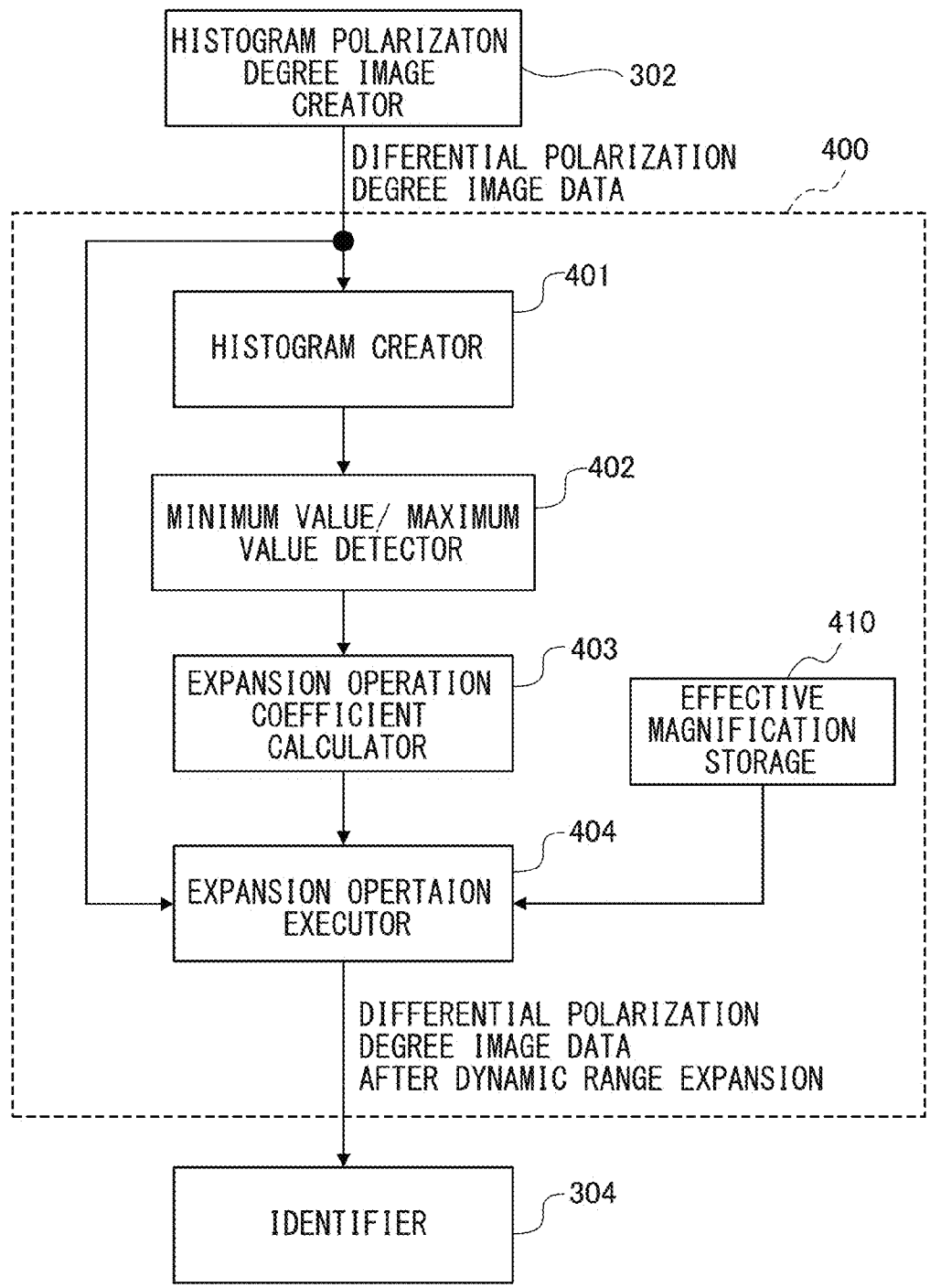
FIG. 15 is a functional block diagram of a dynamic range expander.

FIG. 15 is a functional block diagram of the dynamic range expander 400.

The dynamic range expander 400 of the present embodiment mainly includes a histogram creator 401, a minimum value/maximum value detector 402, an expansion operation coefficient calculator 403, and an expansion operation executor 404.

Figure 16:
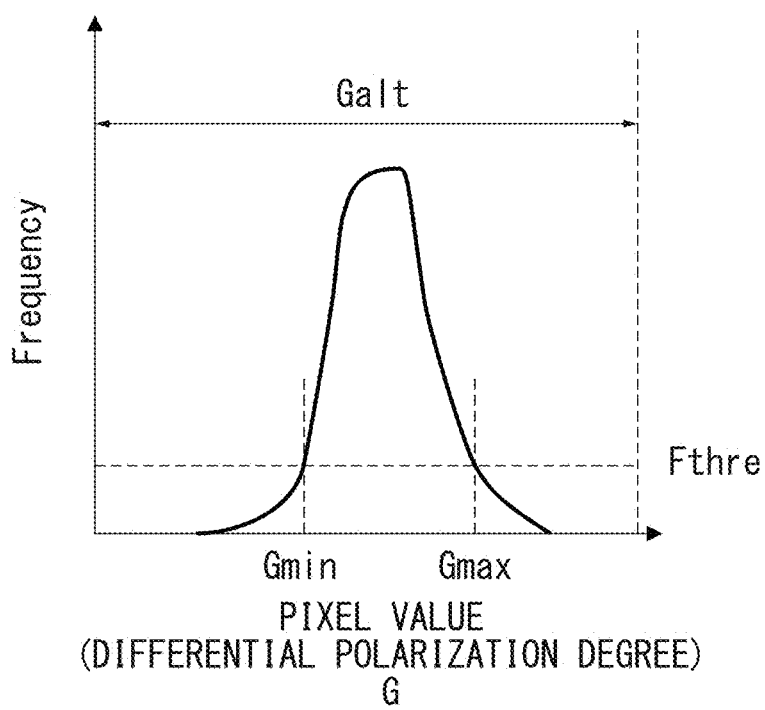
FIG. 16 is an explanatory diagram illustrating an example of a histogram of a pixel value of a differential polarization degree image before correction.

The differential polarization degree image data outputted from the differential polarization image creator 302 is inputted to the histogram creator 302, and the histogram creator 401 creates a histogram as illustrated in FIG. 16 from a frequency distribution of the differential polarization degree image data for one frame (one differential polarization degree image).

The minimum value/maximum value detector 402 detects a minimum pixel value Gmin and a maximum pixel value Gmax of the differential polarization degree image data existing in one frame. Specifically, the minimum value/maximum value detector 402, as illustrated in FIG. 16, extracts a range of pixel value G in which the frequency exceeds a predetermined threshold value Fthre in the histogram created by the histogram creator 401. And a minimum value of the range is taken as a minimum pixel value Gmin of differential polarization degree image data, and a maximum value of the range is taken as a maximum pixel value Gmax of differential polarization degree image data.

In the minimum value/maximum value detector 402, only the pixel value G in which the frequency exceeds the predetermined threshold value Fthre is effective. And a pixel value out of this range is ineffective here, a value of which is treated as zero. Since a pixel value in which the frequency is thus extremely low is ineffective, it is possible to expand contrast of a differential polarization degree image more effectively.

The minimum pixel value Gmin and the maximum pixel value Gmax outputted from the minimum value/maximum value detector 402 is inputted to the expansion operation coefficient calculator 403, and the expansion operation coefficient calculator 403 calculates an expansion operation coefficient K as magnification from the following Expression (1). Note that "Galt" in the following Expression (1) expresses an upper limit of a maximum range (ideal index value range) that can be taken by the pixel value of the differential polarization degree image data. In the present embodiment, as described above, since the pixel value of the differential polarization degree image data is a 10-bit data that takes the integer range of equal to or more than 0 and less than or equal to 1023, "Galt"=1023.

$$K = \text{Galt}/(\text{Gmax} - \text{Gmin}) \qquad \text{Expression (1)}$$

When the expansion operation executor 404 obtains an expansion operation coefficient K from the expansion operation coefficient calculator 403, each pixel value corresponding to the differential polarization degree image data is sequentially inputted in a predetermined order (pixel number order). And each inputted pixel value is multiplied by the expansion operation coefficient K, and then outputted. Therefore, for example, the dynamic range of 400 to 700 (Gmin=400, Gmax=700) in the differential polarization image data before correction is expanded to 0 to 1023, which is the maximum range, in the differential polarization image data. It is easy to achieve the operation performed in the expansion operation executor 404 by a calculation operation by hardware (multiplier), and in the present embodiment, the operation of the expansion operation executor 404 is achieved by a hardware operation by a multiplier.

Here, a range that can be taken by a pixel value of the differential polarization degree image data before correction based on the image data outputted from the imager 200, due to a transmittance characteristic having the polarization filter layer 202 of the optical filter 205, is limited to a predetermined effective range (effective index value range) calculated from the transmittance characteristic. The vertical polarization region and the horizontal polarization region constituting the polarization filter 222 in the present embodiment have the same transmittance characteristic as the P-polarization filter and the S-polarization filter illustrated in the above Table 1, respectively. In this case, the range that can be taken by the pixel value of the differential polarization image data before correction is limited to a range that is equal to or more than 215 and less than or equal to 747 (effective index value range) as described above, and in principle, a pixel value out of the effective range is not calculated.

However, where noise is included in an image signal in the imager 200, an inappropriate pixel value out of the effective range is often calculated. In such a case, if the dynamic range expansion operation is performed by use of the expansion operation coefficient K calculated by the expansion operation coefficient calculator 403, the differential polarization degree image data after correction is created in a state where the inappropriate pixel value is obviously included.

Additionally, originally, the pixel value out of the above effective range (215 to 747) cannot be taken, and therefore, if the dynamic expansion operation is performed by use of an expansion operation coefficient Kthre (hereinafter, referred to as "expansion operation coefficient threshold value") that expands the effective range (215 to 747) to the range that can be taken by the pixel value of the differential polarization degree image data (0 to 1023), or the vicinity of that, it is possible to expand the dynamic range at maximum within the limit where an appropriate pixel value is not out of the range (0 to 1023) that can be taken by the pixel value of the differential polarization degree image data. However, if the inappropriate pixel value out of the effective range exists, the expansion operation coefficient K calculated by the expansion operation coefficient calculator 403 is a smaller than the expansion operation coefficient threshold value Kthre. As a result, magnification is limited, and there is a case where it is difficult to obtain sufficient contrast in a differential polarization degree image after correction.

Figure 17:
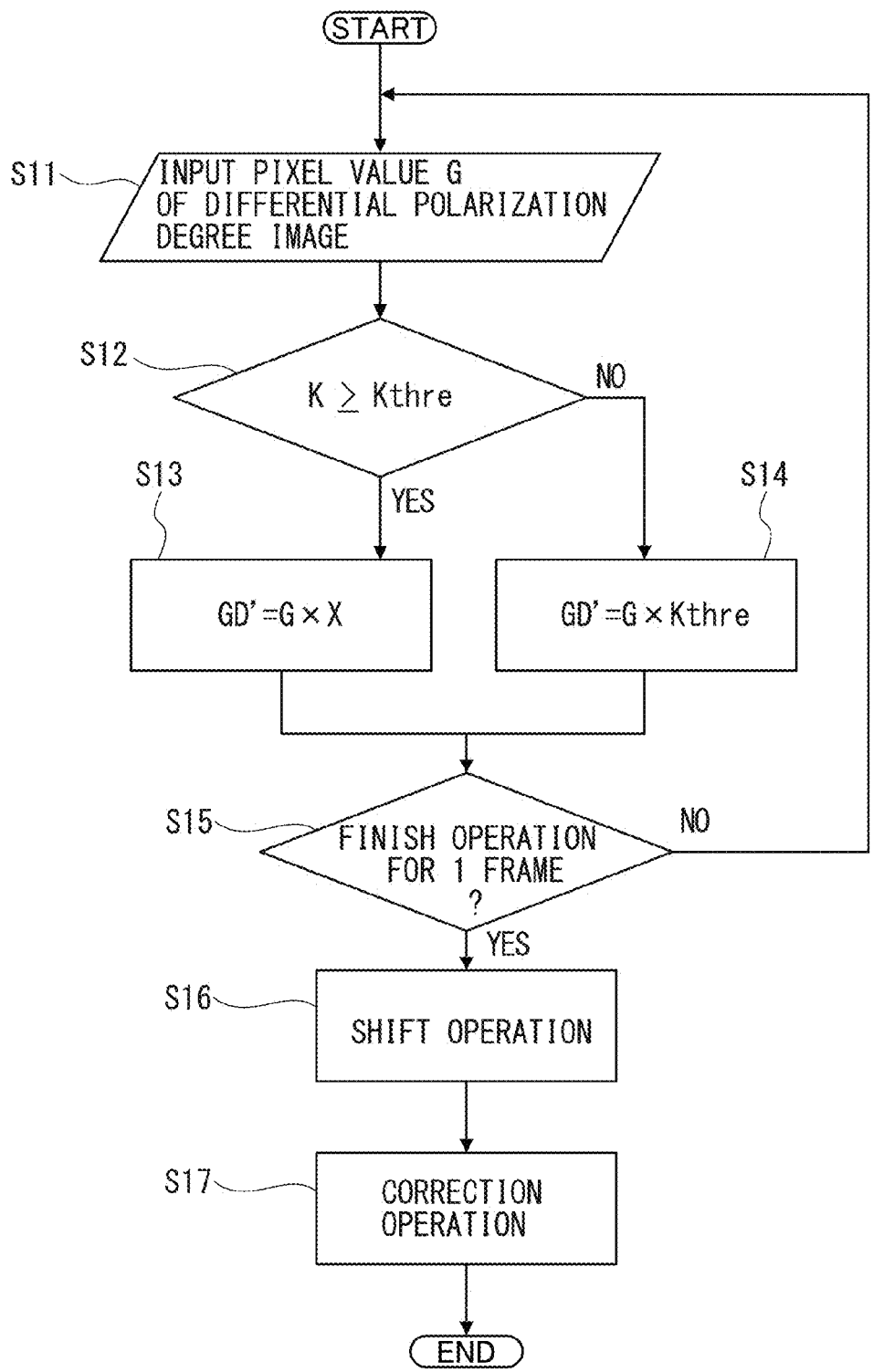
FIG. 17 is a flow diagram illustrating a flow of a dynamic range expansion operation in an expansion operation executor of the dynamic range expander.

FIG. 17 is a flow diagram that illustrates a flow of the dynamic range expansion operation in the expansion operation executor 404.

After obtaining the expansion operation coefficient K from the expansion operation coefficient calculator 403, firstly, the expansion operation executor 404 inputs a first pixel value G in corresponding differential polarization degree image data for one frame (step S11). And the expansion operation executor 404 compares a magnitude relationship between the expansion operation coefficient K obtained from the expansion operation coefficient calculator 403 and the expansion operation coefficient threshold value Kthre stored in advance in an effective magnification storage 410. In this comparison, if K Kthre (Yes of step S12), the inputted pixel value G is multiplied by the expansion operation coefficient K, and a pixel value after expansion GD' is calculated (step S13). On the other hand, if K<Kthre (No of step S12), the inputted pixel value G is multiplied by the expansion operation coefficient threshold value Kthre, and the pixel value after expansion GD' is calculated (step S14).

The above operations are sequentially performed until on a last pixel value in the corresponding differential polarization degree image data for one frame (step S15). And when the operation is performed on the last pixel value (Yes of step S15), it is determined that calculation of the pixel value after expansion GD' is finished on all the pixel values G of the corresponding differential polarization degree image data for one frame. Since a range of the calculated pixel value after expansion GD' is expanded with reference to the minimum pixel value Gmin, an upper limit side of the range of the calculated pixel value after expansion GD' takes a value that exceeds a range of the pixel value of the differential polarization degree image (0 to 1023). Therefore, a shift operation that shifts the range of the pixel value after expansion GD' to a lower limit side, and adjusts it to the range of the pixel value of the differential polarization degree image (0 to 1023) is performed (step S16). For example, the shift operation that entirely shifts the pixel value after expansion GD' such that a center value of the range of the pixel value after expansion GD' corresponds to a center value of the range of the pixel value of the differential polarization degree image (0 to 1023). A value after thus performing the shift operation on the pixel value after expansion GD' becomes a pixel value after expansion GD as a corrected index value. In place of the shift operation, the minimum pixel value Gmin can be subtracted from each pixel value inputted to the expansion operation executor 404. In this case, since the a value in the middle of calculation is small, there is an advantage to have less memory.

Here, the pixel value after correction GD calculated by using the expansion operation coefficient threshold value Kthre includes a value that exceeds a maximum range (integer range of equal to or more than 0 and less than or equal to 1023) that can be taken by the pixel value of the differential polarization degree image. Therefore, in the present embodiment, a correction operation in which a pixel value after correction GD that is smaller than 0 is rounded to 0, and a pixel value after correction GD that is larger than 1023 is rounded to 1023 is performed (step S17). Thus, the pixel value after correction GD is finally calculated. The pixel value after correction GD thus calculated is outputted to the identifier 304.

Note that the pixel value after correction GD that exceeds the maximum range (integer range of equal to or more than 0 and less than or equal to 1023) that can be taken by the pixel value of the differential polarization degree image is originally based on the inappropriate pixel value out of the effective range (215 to 747) calculated by the transmittance characteristic having the polarization filter layer 222 of the optical filter 205. Therefore, in place of the above correction operation, an operation that removes such an inappropriate pixel value after correction GD is not used in the following identifier 304 can be performed. For example, an error flag is added to such an inappropriate pixel value after correction GD, and such an inappropriate pixel value after correction GD is converted to a predetermined error value.

MODIFIED EXAMPLE 1

Next, a modified example (hereinafter, referred to as "Modified Example 1") of a dynamic range expander 400 in the present embodiment will be explained.

The above embodiment is an example of the dynamic range expansion operation achieved by the hardware operation in which each pixel value of a differential polarization degree image is multiplied by a coefficient K, Kthre. In Modified Example 1, an example of the dynamic range expansion operation achieved by a software operation by a CPU (Central Processing Unit) by use of an existing BRAM (Block RAM) on an electronic circuit substrate having the CPU will be explained.

Figure 18:
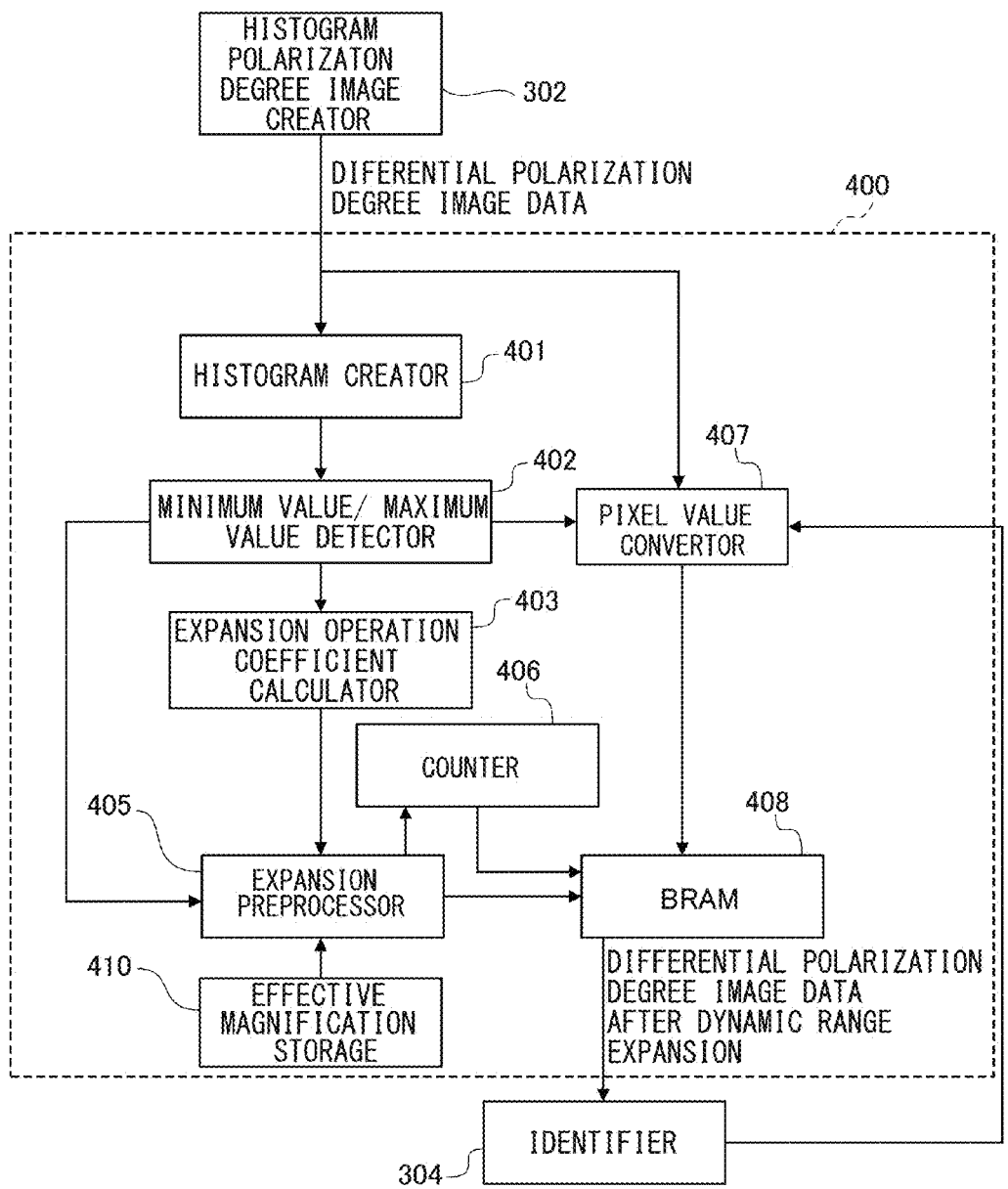
FIG. 18 is a functional block diagram of the dynamic range expander in Modified Example 1.

FIG. 18 is a functional block diagram of the dynamic range expander 400 in Modified Example 1.

The dynamic range expander 400 in Modified Example 1 mainly includes a histogram creator 401, a minimum value/maximum value detector 402, an expansion operation coefficient calculator 403, an expansion preprocessor 405, a counter 406, a pixel value convertor 407, and a BRAM 408. Note that the operations of the histogram creator 401, the minimum value/maximum value detector 402, and the expansion operation coefficient calculator 403 are the same as those in the above embodiment, and therefore, the explanation of those is omitted.

Figure 19:
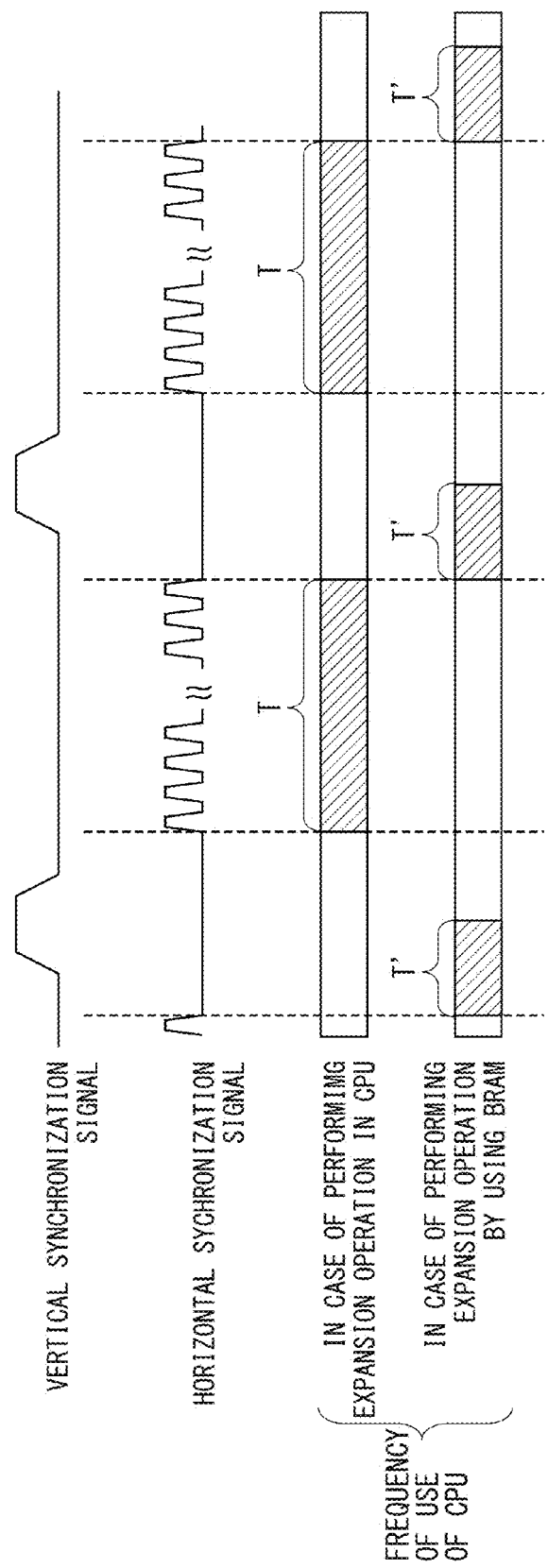
FIG. 19 is an explanatory diagram that compares a frequency of use of a CPU in a case of performing the dynamic range expansion operation in the CPU, and in a case of performing the dynamic range expansion operation using a BRAM.

In Modified Example 1, by using the BRAM 408, it is possible to lessen the frequency of the CPU engaging in the dynamic range expansion operation, and increase the frequency of the CPU engaging in an operation of the identifier 304. With reference to FIG. 19, in a case of performing the dynamic range expansion operation by the CPU, during a period T where the differential polarization image data flows, the CPU is used. On the other hand, in a case of performing the dynamic range expansion operation by using the BRAM 408, only during a period T' where a value of an expansion operation before and after correction corresponding to each pixel value is stored in the BRAM 408 is the CPU used. Thus, the operation of the identifier 304 is enriched, and identification accuracy is improved.

As a preprocessing operation of the dynamic expansion operation performed by using the BRAM 408 by the software operation of the CPU, the expansion preprocessor 405 performs an operation that stores the differential polarization degree image data after correction in the BRAM 408 in a state of corresponding to the differential polarization degree image data before correction. The detailed operation will be explained later.

The counter 406 is used for the preprocessing operation by the expansion preprocessor 405, and is a counter that counts up a pixel value one by one from a minimum pixel value Gmin to a maximum pixel value Gmax.

The pixel value convertor 407 receives the minimum pixel value Gmin and the maximum pixel value Gmax outputted by the minimum value/maximum value detector 402, and performs a pixel value conversion operation in which an inappropriate pixel value out of a range between the minimum pixel value Gmin and the maximum pixel value Gmax is rounded to the minimum pixel value Gmin or the maximum pixel value Gmax. The detailed operation will be later described.

Figure 20:
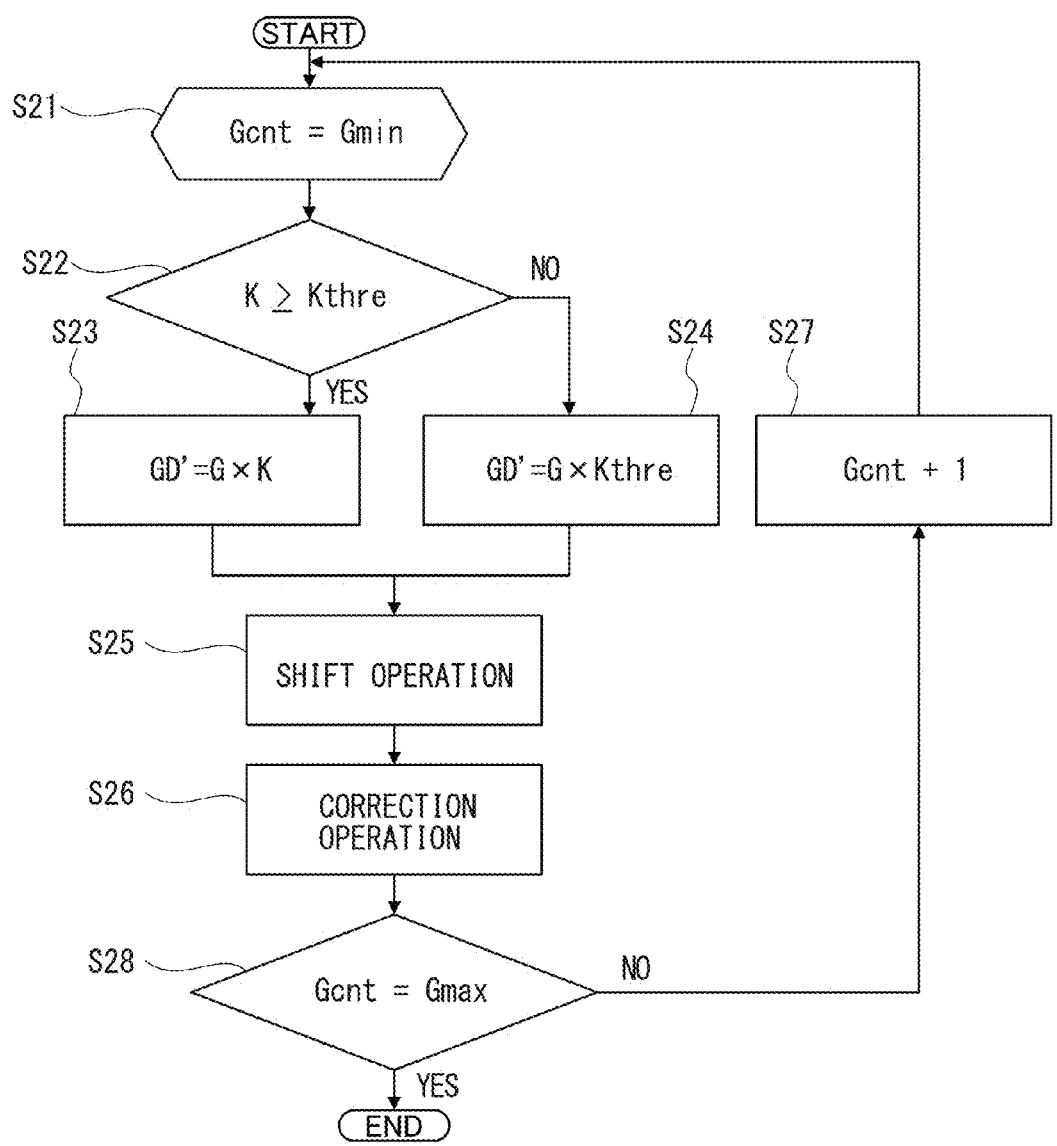
FIG. 20 is a flow diagram illustrating a flow of a preprocessing operation in an expansion preprocessor of the dynamic range expander.

FIG. 20 is a flow diagram that illustrates a flow of an expansion preprocessing operation in the expansion preprocessor 405.

When the expansion preprocessor 405 obtains an expansion operation coefficient K from the expansion operation coefficient calculation part 403, firstly, the minimum pixel value Gmin is obtained from the minimum value/maximum value detector 402, and a count value Gcnt of the counter 406 is set to the minimum pixel value Gmin (step S21). And a magnitude relationship between the expansion operation coefficient K obtained from the expansion operation coefficient calculator 403 and an expansion operation coefficient threshold value Kthre stored in advance in the effective magnification storage 410 are compared (step S22). In this comparison, if K≥Kthre (Yes of step S22), a corresponding pixel value G is multiplied by the expansion operation coefficient K, and a pixel value after expansion GD' is calculated (step S23). On the other hand, if K<Kthre (No of step S22), an inputted pixel value G is multiplied by the expansion operation coefficient threshold value Kthre, and a pixel value after expansion GD' is calculated (step S24).

And then, the shift operation, which is the same as in the above embodiment, is performed on the calculated pixel value after expansion GD', and a pixel value after correction GD is calculated (step S25). And additionally, as well as the correction operation in the above embodiment, after the shift operation, a correction operation in which the pixel value after correction GD that is smaller than 0 is rounded to 0, and the pixel value after correction GD that is larger than 1023 is rounded to 1023 is performed (step S26). The pixel value after correction GD thus calculated is stored in the BRAM 408 in a state of corresponding to a corresponding pixel value before correction G (count value Gcnt).

And then, a count value of the counter 406 is counted up (step S27), and an operation that calculates the pixel value after correction GD is also performed, with respect to a pixel value G corresponding to the count value Gcnt (steps S22 to S26). The above operations are repeatedly performed until the count value Gcnt reaches the maximum value Gmax (step S28). Thus, each pixel value after expansion GD' corresponding to each pixel value before correction G (count value Gcnt) from the minimum pixel value Gmin to the maximum pixel value Gmax is stored in the BRAM 408.

Figure 21:
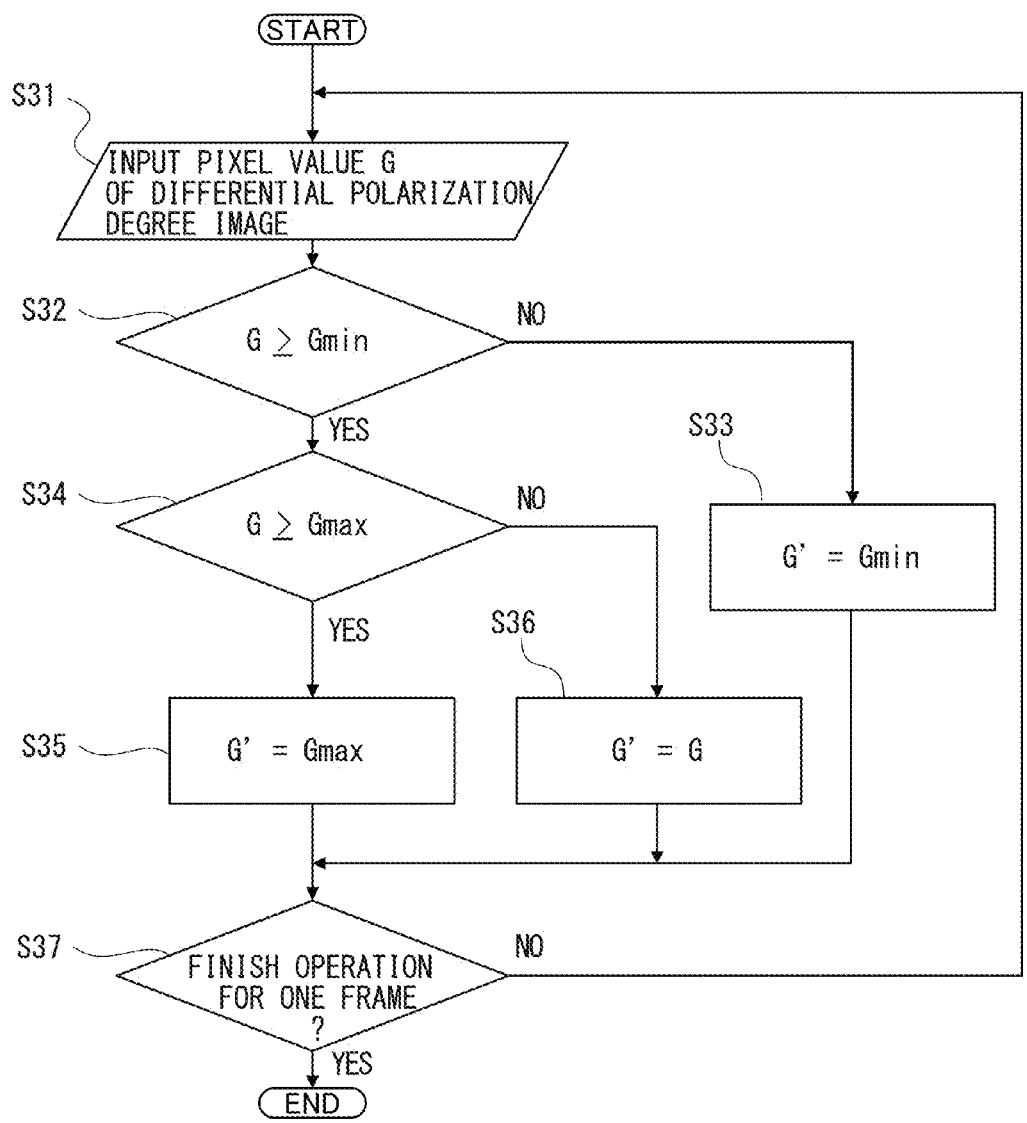
FIG. 21 is a flow diagram illustrating a flow of an operation in a pixel value convertor of the dynamic range expander.

FIG. 21 is a flow diagram illustrating a flow of an operation in the pixel value convertor 407.

Firstly, the pixel value convertor 407 inputs a first pixel value G in the corresponding differential polarization degree image data for one frame (step S31). And a minimum pixel value Gmin and a maximum pixel value Gmax is obtained from the minimum value/maximum value detector 402, and a magnitude relationship between the inputted pixel value G and the minimum pixel value Gmin is compared (step S32). In this comparison, if G<Gmin (No of step S32), an operation is performed in which the inputted pixel value G is converted to the minimum pixel value Gmin, and it is taken as a pixel value after conversion G' (step S33).

On the other hand, if G≥Gmin (Yes of S32), a magnitude relationship between the inputted pixel value G and the maximum pixel value Gmax is compared (step S34). In this comparison, if G≥Gmax (Yes of S34), an operation is performed in which the inputted pixel value G is converted to the maximum pixel value Gmax, and it is taken as a pixel value after conversion G' (step S35). If G<Gmax (No of step S34), the inputted pixel value G is directly taken as the pixel value after conversion G' (step S36). The pixel value after conversion G' thus converted is sequentially outputted to the BRAM 408.

The above operations are sequentially performed until on a last pixel value in the corresponding differential polarization degree image data for one frame (step S37). And when the operation is finished on the last pixel value (Yes of step S37), it is determined that conversion to the pixel value after conversion G' is finished on all the pixel values G in the corresponding differential polarization degree image data for one frame.

Figure 22:
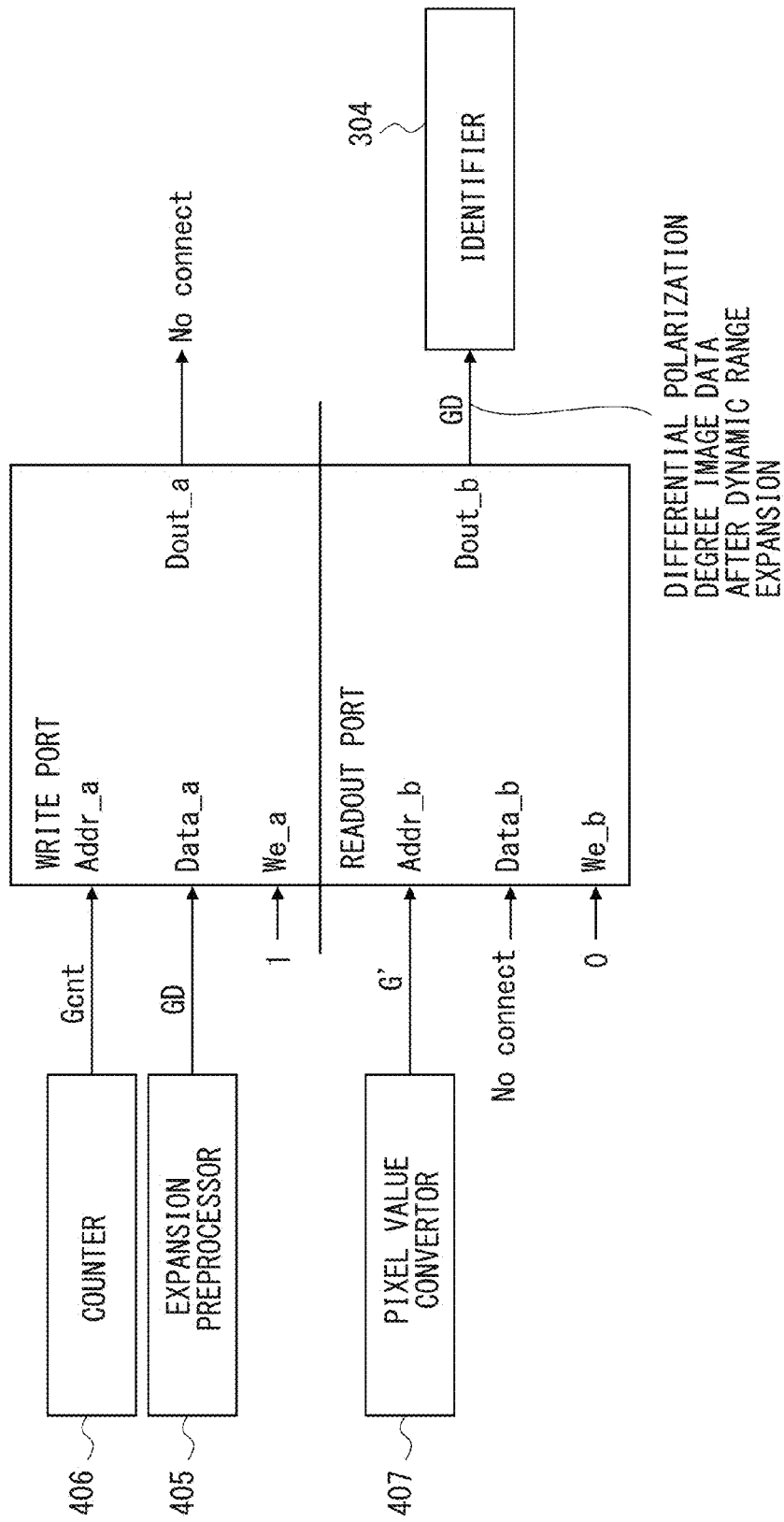
FIG. 22 is an explanatory diagram illustrating a schematic structure of the BRAM in Modified Example 1.

FIG. 22 is an explanatory diagram illustrating a schematic structure of the BRAM 408 in Modified Example 1.

In Modified Example 1, the BRAM 408 has two ports of a write port for write-only and a readout port for read-only.

A count value Gcnt of the counter 406 is inputted to an address terminal Addr_a (write address terminal) of the write port. The pixel value after correction GD as an output value of the expansion preprocessor 405 is inputted to a data input terminal Data_a (write data terminal) of the write port. Note that the write port is for write-only, and therefore, 1 as a write enable signal is inputted to a write enable terminal We_a, and a data output terminal Dout_a is not connected.

The pixel value after conversion G' as an output value of the pixel value convertor 407 is inputted to an address terminal Addr_b (readout address terminal) of the readout port. The identifier 304 is connected to a data output terminal Dout_b of the readout port. Note that the readout port is for read-only, and therefore, a data input terminal Data_b (readout data terminal) is not connected, and 0 as a write disable signal is inputted to a write enable terminal We_b.

Figure 23:
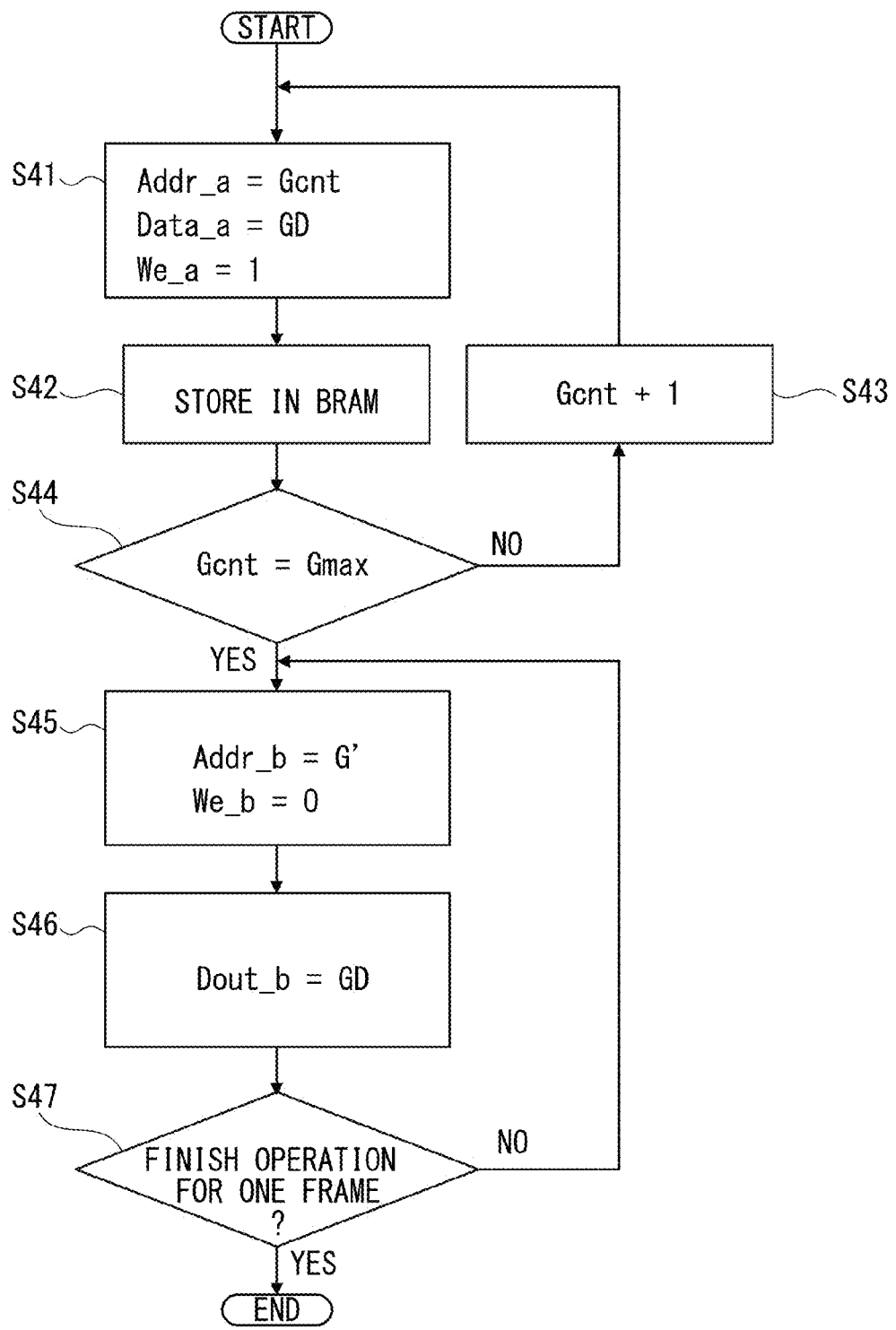
FIG. 23 is a flow diagram illustrating a flow of an operation of the BRAM.
Figure 24:
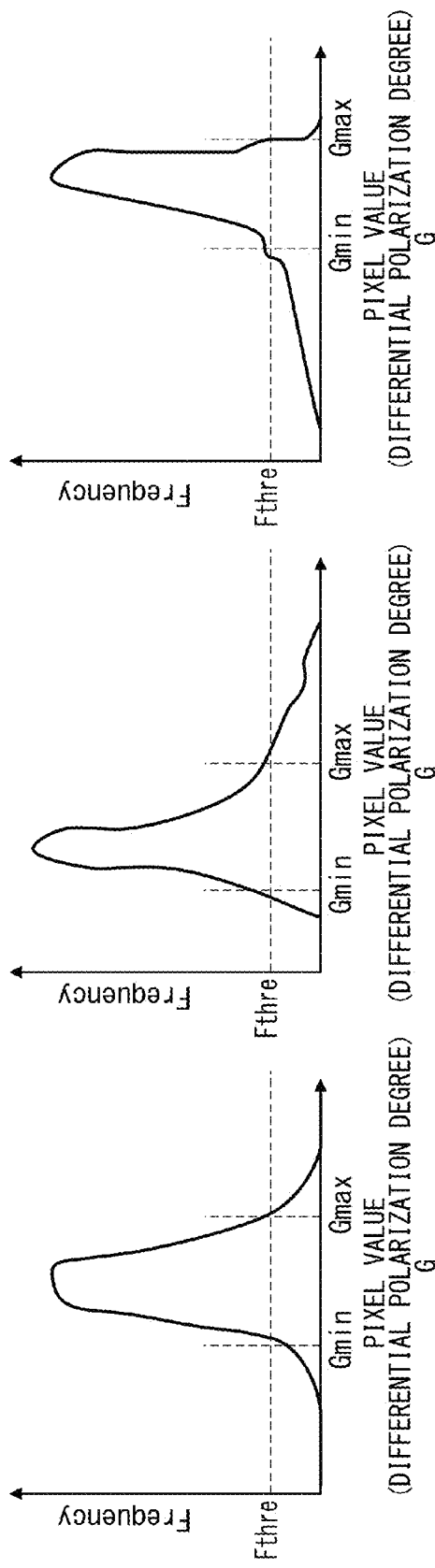

FIG. 23 is a flow diagram illustrating a flow of an operation of the BRAM 408 in Modified Example 1.

Firstly, to the address terminal Addr_a of the write port of the BRAM 408, a first count value Gcnt of the counter 46 is inputted (step S41). That is, to the address terminal Addr_a of the write port, the minimum pixel value Gmin is inputted. Additionally, to the data input terminal Data_a of the write port, the pixel value after correction GD calculated with respect to the count value Gcont (minimum pixel value Gmin) in the preprocessing operation of the expansion preprocessor 405 is inputted (step S41). Thus, the pixel value after correction GD calculated with respect to the count value Gcnt (minimum pixel value Gmin) is stored in an address of the BRAM 408 specified by the count value Gcnt (minimum value Gmin) (step S42).

And then, the count value Gcnt of the counter 406 is counted up (step S43), and the above write operations (steps S41 to 43) are repeatedly performed until the counter value Gcnt becomes the maximum pixel value Gmax (step S44). Thus, the pixel value after correction GD corresponding to each pixel value is stored in an address of the BRAM specified by each pixel value from the minimum pixel value Gmin to the maximum pixel value Gmax.

Next, the pixel value after conversion G' as an output value of the pixel value convertor 407 is inputted to the address terminal Addr_b of the readout port of the BRAM 408 (step S45). That is, to the address terminal Addr_b of the readout port, the pixel value after conversion G' corresponding to a first pixel number is inputted. Thus, the pixel value after correction GD that is stored in the address of the BRAM 408 specified by the pixel value after conversion G' is outputted from the data output terminal Dout_b of the readout port (step S46).

To the address terminal Add_b of the readout port of the BRAM 408, the pixel value after correction G' outputted from the pixel value convertor 407 is inputted sequentially in order of a pixel number from the first pixel number to a last pixel number, and therefore, the pixel value after correction GD is sequentially outputted in order of the pixel number from the data output terminal Dout_b of the readout port of the BRAM 408. Such a readout operation is performed on all the pixel values of the corresponding differential polarization image data for one frame (step S47). Thus, the differential polarization degree image data constituted by the pixel value after correction GD is inputted to the identifier 304.

In the above embodiment, each pixel value G corresponding to each of all pixels of the differential polarization degree image data is inputted to a multiplier of hardware in order of the pixel number, and by the multiplier, each pixel value G is multiplied by a coefficient K, Kthre, and a pixel value after correction GD is outputted from the multiplier in order the pixel number, and therefore, differential polarization degree image data constituted by the pixel value after correction GD is obtained. According to this constitution, due to use of the multiplier of the hardware, there is a disadvantage in that hardware resources become larger; however, there is an advantage in that an operation time is shortened.

On the other hand, in Modified Example 1, a pixel value after correction GD that is obtained by multiplying each pixel value from a minimum pixel value Gmin to a maximum pixel value Gmax of differential polarization degree image data by a coefficient K, Kthre is stored in the BRAM 408 in a state of corresponding to a pixel value before correction G,. Then, in order of the pixel number, the pixel value before correction G is sequentially inputted to the BRAM 408, and therefore, the pixel value after correction GD is outputted in order of the pixel number from the BRAM 408, and the differential polarization degree image data constituted by the pixel value after correction GD is obtained. According to this constitution, a multiplication operation is performed by an existing CPU, and there is a disadvantage of taking a longer operation time; however, there is an advantage of achieving the operation with less hardware resources.

MODIFIED EXAMPLE 2

Next, another Modified example (hereinafter, referred to as "Modified Example 2") of the dynamic range expander 400 in the present embodiment will be explained.

Each of FIGS. 24A to 24E is an explanatory example illustrating a shape example that can be taken by a histogram of a pixel value G of a differential polarization degree image (before correction) obtained by actual imaging.

A threshold value Fthre in the drawing is the same as the threshold value Fthre in FIG. 16. In view of the transmittance characteristic of the polarization filter layer 222 of the optical filter 205, an absolute value of a difference between a minimum pixel value Gmin and a maximum pixel value Gmax, in principle, satisfies a relational expression expressed by the following Expression (2).

$$|Gmax-Gmin| \leq Galt/Kthre \qquad \text{Expression (2)}$$

FIG. 25 is a functional block diagram of the dynamic range expander 400 in Modified Example 2.

The dynamic range expansion operation part 400 in Modified Example 2 further includes a magnification calculation determiner 409 between the minimum value/maximum value detector 402 and the expansion operation coefficient calculator 403 in the embodiment illustrated in FIG. 15. The operations of the histogram creator 401 and the minimum value/maximum value detector 402 are the same as those in the above embodiment illustrated in FIG. 15, and therefore, the explanation is omitted.

However, in Modified Example 2, an operation equivalent to the comparison of the magnitude relationship between the expansion operation coefficient K and the expansion operation coefficient threshold value Kthre stored in advance in the effective magnification storage 410 performed in the expansion operation executor 404 (step S12 in FIG. 17) is performed in a later-described operation (step S53 in FIG. 26) in the expansion operation coefficient calculator 403. Therefore, in the operation of the expansion operation executor 404 in Modified Example 2, an operation that outputs a pixel value GD' by multiplying the inputted pixel value G by the expansion operation coefficient K from the expansion operation calculator 403 is performed with respect to differential polarization degree image data for one frame.

Note that it is possible to add the magnification calculation determiner 409 to the dynamic range expander 400 in the above Modified Example 1 as well.

FIG. 26 is a flow diagram illustrating a flow of a dynamic range expansion operation performed by the magnification calculation determiner 409 and the expansion operation coefficient calculator 403 in the present Modified example 2.

A minimum pixel value Gmin and a maximum pixel value Gmax from the minimum value/maximum value detector 402 are inputted to the magnification calculation determiner 409 (step S51), and the magnification calculation determiner 409 calculates an absolute value of a difference ΔG between the minimum pixel value Gmin and the maximum pixel value Gmax (step S52). Then, a magnitude relationship between the calculated absolute value of the difference ΔG and a value in which the upper limit of the ideal index value range Galt is divided by the expansion operation coefficient threshold value Kthre is compared (step S53). In this comparison, if ΔG>Galt/Kthre (Yes of step S53), an execution determination flag Flag that indicates whether the dynamic range expansion operation is executed or not is set to 0 (step S54). On the other hand, if ΔG≤Galt/Kthre (No of step S53), the execution determination flag Flag that indicates whether the dynamic range expansion operation is executed or not is set to 1 (step S55). The execution determination flag Flag thus set is outputted to the expansion operation coefficient calculator 403.

In the expansion operation coefficient calculator 403, firstly, it is determined whether a value of the execution determination flag Flag inputted from the magnification calculation determiner 409 is 1 or not (step S56). In a case where the value of the execution determination flag Flag is 1 (Yes of step S56), an expansion operation coefficient K is calculated from the above Expression (1) as well as the embodiment in FIG. 15, and the expansion operation coefficient K is outputted to the expansion operation executor 404 (step S58). On the other hand, in a case where the value of the execution determination flag Flag is 0 (No of step S56), the expansion operation coefficient threshold value Kthre stored in advance in the effective magnification storage 410 is taken as the expansion operation coefficient K, and the expansion operation coefficient K (=Kthre) is outputted to the execution operation executor 404 (step S57).

In the expansion operation executor 404 in the present Modified Example 2, as described above, an operation that outputs a pixel value after expansion GD' by multiplying the inputted pixel value G by the expansion operation coefficient K from the expansion operation coefficient calculator 403 is executed. Therefore, if ΔG>Galt/Kthre, that is, if the magnification K (=Galt/(Gmax−Gmin)) calculated from the minimum pixel value Gmin and the maximum pixel value Gmax outputted from the minimum pixel value/maximum pixel value detector 402 is larger than the expansion operation coefficient threshold value Kthre, the dynamic range expansion operation is performed by the expansion operation coefficient K calculated from the minimum pixel value Gmin and the maximum pixel value Gmax. On the other hand, if ΔG≤Galt/Kthre, that is, if the magnification K (=Galt/(Gmax−Gmin)) calculated from the minimum pixel value Gmin and the maximum pixel value Gmax outputted from the minimum pixel value/maximum pixel value detector 402 is less than or equal to the expansion operation coefficient threshold value Kthre, the dynamic range expansion operation is executed by the expansion operation coefficient threshold value Kthre.

FIG. 27A is a diagram that illustrates a differential polarization degree image in which the dynamic range expansion operation is not performed (before operation), and a histogram of a pixel value of the image.

FIG. 27B is a diagram that illustrates a differential polarization degree image in which the dynamic range expansion operation has been performed (after operation), and a histogram of a pixel value of the image.

As illustrated in FIG. 27A, in a case where the dynamic range expansion operation is not performed, the histogram of the pixel value (pixel value before correction G) of the image has a narrow shape in which pixel values are concentrated in a narrow range, and contrast of the differential polarization degree image is low. Therefore, it is difficult to identify a white line and a road side. On the other hand, in a case where the dynamic range expansion operation has been performed, as illustrated in FIG. 27B, the histogram of the pixel value (pixel value after correction GD) of the image has a wider shape in which pixel values are widely distributed, and contrast of the differential polarization degree image is high. Therefore, it is easy to identify the white line and the road side.

Note that in the above embodiment and each modified example, the dynamic range expansion operation is performed in the image analysis unit 102 to which the imaged image data outputted from the imaging unit 101 is inputted; however, the dynamic range expansion operation can be performed in the imaging unit 101. In this case, for example, a main structure of the signal processor illustrated in FIG. 3 can be constituted by a signal processing circuit 208A and a CPU 208B, as illustrated in FIG. 28. The signal processing circuit 208A converts an electric signal (analog signal) outputted from the image sensor 206 illustrated in FIG. 3 to imaged image data as a digital signal, and sends it to the CPU 208B. The CPU 208B functions as the interpolator 301, the differential polarization degree image creator 302, the brightness image creator 303, and the dynamic range expander 400 played by the above image analysis unit 102, and performs the operations performed in the above.

Additionally, in a case where the dynamic range expansion operation is performed in the imaging unit 101 and the BRAM 408 is used as the above Modified Example 1, for example, a main structure of the signal processor 208 illustrated in FIG. 3 can be constituted by a signal circuit 208A, a CPU 208B, a BRAM 208C corresponding to the BRAM 408, as illustrated in FIG. 29. In this case, since a part of the operation performed by the CPU 208B in the structure example illustrated in FIG. 28 is performed, it is possible to increase the frequency of a CPU engaging in the dynamic range expansion operation, and reduce the frequency of a CPU engaging in the operation of the identifier 304.

The S-polarization filter and the P-polarization filter are included in a plurality of types of selective filter regions. The red color spectral region is included in at least equal to or more than one type of a selective filter region. The non-spectral region is included in a non-selective filter region. The histogram creator 401, the minimum value/maximum value detector 402, the expansion operation coefficient calculator 403, the magnification calculation determiner 409 and the like are included in a magnification calculator. The expansion operation executor 404, the expansion preprocessor 405, the counter 406, the BRAM 408, and the like are included in an expansion operation device. The expansion preprocessor 405 and like are included in an index value corrector. The pixel value convertor 407 and the like are included in a readout data specifier.

According to the embodiment including the modified examples of the present invention, magnification is not limited by an existence of an inappropriate index value before correction out of an effective index value range (215 to 747), and it is possible to obtain a high-contrast index value image.

According to the embodiment including the modified examples of the present invention, it is possible to achieve an image analysis operation using polarization information, and obtain various information, which are difficult to obtain from only brightness information, with high accuracy.

Since an index value before correction with low frequency has a high possibility to be a noise component, using frequency distribution information makes it possible to remove such a noise component appropriately.

According to the embodiment including the modified examples of the present invention, it is possible to easily remove the pixel value before correction with low frequency that has a high possibility to be the noise component.

As explained in the above Modified Example 1, there is an advantage in that it is possible to achieve the operation with less hardware resources.

According to the embodiment including the modified examples of the present invention, even if a pixel value removed by a predetermined frequency threshold value Fthre is inputted, an error does not occur, and it is possible to achieve the operation smoothly.

According to the embodiment including the modified examples of the present invention, due to using a multiplier of hardware, it is easy to shorten an operation time than by a software operation.

According to the embodiment including the modified examples of the present invention, a clearly inappropriate pixel value after correction GD is never used in the following identifier 304, and therefore, it is possible to suppress a decrease in accuracy of an identification operation due to the inappropriate pixel value after correction GD.

According to the embodiment including the modified examples of the present invention, it is possible to improve image analysis accuracy of a vehicle system.

Note that in an in-vehicle device control system according to the embodiment including the modified examples of the present invention, an example where an entire imaging apparatus is included in a vehicle 100 has been described; however, it is only necessary that an imaging unit 101 is equipped with the vehicle, and the rest is not always necessary to be equipped with the vehicle. Therefore, for example, only the imaging unit 101 is included in the vehicle 100, and the rest can be remotely arranged in another place. In this case, the system can be a system by which a person other than a driver of the vehicle objectively grasps a travelling state of the vehicle.

According to the embodiment including the modified examples of the present invention, due to an existence of an inappropriate pixel value before correction out of an effective index value range, magnification is not limited, and therefore, it is possible to obtain a high-contrast index value image.

According to the embodiment including the modified examples of the present invention, even in a case where an inappropriate index value exists, it is possible to obtain a high-contrast index value image.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
an imaging device to receive light from each position in an imaging region through an optical filter in which a plurality of types of selective filter regions to selectively transmit optical components different to each other are periodically arranged, or an optical filter in which at least equal to or more than one type of selective filter region to selectively transmit a specific optical component and a non-selective filter region to directly transmit incident light are periodically arranged, and to output an image signal in accordance with a received-light amount per filter region on the optical filter; and
an image processor to output an index value image having a pixel value based on an index value that indicates a difference in magnitude of a plurality of optical components different to each other included in the light from each position in the imaging region, based on the image signal outputted from the imaging device;
the image processor including:
a magnification calculator to calculate magnification to expand a range of an index value before correction calculated based on an image signal corresponding to one index value image outputted from the imaging device as a range of the index value to a maximum range of an ideal index value that can be taken by the index value, or a vicinity of that, in a case where the filter regions on the optical filter have ideal transmittance characteristics;
an expansion operation device to perform an expansion operation such that the index value before correction used as a pixel value of the one index value image outputted from the image processor is corrected by use of magnification calculated by the magnification calculator, and a range of an index value after correction becomes the range of the ideal index value, or a vicinity of the range of the ideal index value; and
an effective magnification storage to store effective magnification so as to expand a maximum range of an effective index value that can be taken by the index value before correction calculated from transmittance characteristics of the filter regions on the optical filter have to the range of the ideal index value, or a vicinity of the range of the ideal index value,
wherein the expansion operation device is configured to perform the expansion operation by use of the effective magnification stored in the effective magnification storage, when the magnification calculated by the magnification calculator is smaller than the effective magnification stored in the effective magnification storage, and wherein the selective filter region is constituted by a polarization filter to selectively transmit a polarization component.

2. The imaging apparatus of claim 1, wherein the magnification calculator is configured to determine the range of the index value before correction based on frequency distribution information of the index value before correction calculated based on the image signal corresponding to the one index value image outputted from the imaging device.

3. The imaging apparatus of claim 2, wherein the magnification calculator is configured to extract a range of the index value in which frequency exceeds a frequency threshold value based on the frequency distribution information, and is configured to determine the extracted range as the range of the index value before correction.

4. The imaging apparatus of claim 3, wherein the expansion operation device includes a memory is configured to store data inputted to a write data terminal in an address corresponding to write address data inputted to a write address terminal, and is configured to output data stored in an address corresponding to readout address data inputted to a readout address terminal from a readout data terminal; a counter configured to sequentially count from a lower limit to an upper limit, or from the upper limit to the lower limit of the range of the index value extracted by the magnification calculator, and configured to sequentially output each count value to the write address terminal of the memory; an index value corrector configured to output the index value after correction obtained by multiplying the index value before correction used as the pixel value of the one index value image outputted from the image processor by the magnification calculated by the magnification calculator to the write data terminal of the memory in accordance with a timing where a count value corresponding to the index value before correction is outputted to the write address terminal of the memory; and a readout data specifier to, when the index value before correction used as the pixel value of the one index value image outputted from the image processor is less than or equal to the lower limit of the range of the index value extracted by the magnification calculator, output a count value corresponding to the lower limit to the readout address terminal of the memory, and when it is equal to or more than the upper limit of the range of the index value extracted by the magnification calculator, to output a count value corresponding to the upper value to the readout address terminal of the memory, and when it is in the range of the index value extracted by the magnification calculator, to output a count value corresponding to the index value before correction to a readout address terminal of the memory.

5. The imaging apparatus to of claim 1, wherein the expansion operation device includes a memory is configured to store input data in a specified write address, and is configured to output data stored in a specified readout address, and is configured to store data of the index value after correction corrected by use of the magnification calculated by the magnification calculator in a write address corresponding to the index value before correction in the memory.

6. A vehicle system comprising:
a vehicle; and
an imaging apparatus to image an image of a vicinity of the vehicle as an imaging region;
wherein the imaging apparatus of claim 5 is used as the imaging apparatus, and at least the imaging device included in the imaging apparatus is placed in the vehicle.

7. The imaging apparatus to of claim 1, wherein the expansion operation device includes a multiplier to output data in which data inputted to an input terminal of the multiplier is multiplied by a predetermined multiplication coefficient from an output terminal of the multiplier, and wherein the magnification calculated by the magnification calculator is set as the multiplication coefficient of the multiplier, and an index value before correction used as the index value of the one index value image outputted from the image processor is inputted to the input terminal of the multiplier, and the index value after correction is outputted from the output terminal of the multiplier.

8. A vehicle system comprising:
a vehicle; and
an imaging apparatus to image an image of a vicinity of the vehicle as an imaging region;
wherein the imaging apparatus of claim 7 is used as the imaging apparatus, and at least the imaging device included in the imaging apparatus is placed in the vehicle.

9. The imaging apparatus of claim 1, wherein when the magnification calculated by the magnification calculator is smaller than the effective magnification stored in the effective magnification storage, when creating an index value having a pixel value based on the index value after correction by the expansion operation of the expansion operation device, the image processor is configured to remove the index value after correction that is out of the range of the ideal index value by the expansion operation, and is configured to create the index value image.

10. A vehicle system comprising:
a vehicle; and
an imaging apparatus to image an image of a vicinity of the vehicle as an imaging region;
wherein the imaging apparatus of claim 9 is used as the imaging apparatus, and at least the imaging device included in the imaging apparatus is placed in the vehicle.

11. A vehicle system comprising:
a vehicle; and
an imaging apparatus to image an image of a vicinity of the vehicle as an imaging region;
wherein the imaging apparatus of claim 1 is used as the imaging apparatus, and at least the imaging device included in the imaging apparatus is placed in the vehicle.

12. A vehicle system comprising:
a vehicle; and
an imaging apparatus to image an image of a vicinity of the vehicle as an imaging region;
wherein the imaging apparatus of claim 2 is used as the imaging apparatus, and at least the imaging device included in the imaging apparatus is placed in the vehicle.

13. An image-processing method of an imaging apparatus including:
an imaging device to receive light from each position in an imaging region through an optical filter in which a plurality of types of selective filter regions to selectively transmit optical components different to each other are periodically arranged, or an optical filter in which at least equal to or more than one type of selective filter region to selectively transmit a specific optical component and a non-selective filter region to directly transmit incident light are periodically arranged, and to output an image signal in accordance with a received-light amount per filter region on the optical filter; and
an image processor to output an index value image having a pixel value based on an index value that indicates a difference in magnitude of a plurality of optical components different to each other included in the light from each position in the imaging region, based on the image signal outputted from the imaging device;
the image-processing method comprising:
calculating magnification to expand a range of an index value before correction calculated based on an image signal corresponding to one index value image outputted from the imaging device as a range of the index value to a maximum range of an ideal index value that can be taken by the index value, or a vicinity of the ideal index value, when the filter regions on the optical filter have ideal transmittance characteristics; and
performing an expansion operation such that the index value before correction used as a pixel value of the one index value image outputted from the image processor is corrected by use of magnification calculated in the magnification calculation, and a range of an index value after correction becomes the range of the ideal index value, or a vicinity of the ideal index value;
wherein in the performing of the expansion operation, when the magnification calculated is smaller than an effective magnification to expand a range of a maximum effective index value that can be taken by the index value before correction calculated from transmittance of the filter regions on the optical filter, the expansion operation is performed by use of the effective magnification, and wherein the selective filter region is constituted by a polarization filter to selectively transmit a polarization component.

14. The method of claim 13, wherein the range of the index value before correction based on frequency distribution information of the index value before correction is calculated based on the image signal corresponding to the one index value image outputted from the imaging device.

15. The method of claim 14, wherein the a range of the index value, in which frequency exceeds a frequency threshold value based on the frequency distribution information, is extracted and wherein the extracted range is determined as the range of the index value before correction.

16. The method of claim 13, wherein, when the magnification calculated by the magnification calculator is smaller than the effective magnification stored in the effective magnification storage, when creating an index value having a pixel value based on the index value after correction by the expansion operation of the expansion operation device, the index value after correction, that is out of the range of the ideal index value by the expansion operation, is removed and the index value image is created.

* * * * *